(12) United States Patent
Desloge

(10) Patent No.: US 7,254,199 B1
(45) Date of Patent: Aug. 7, 2007

(54) LOCATION-ESTIMATING, NULL STEERING (LENS) ALGORITHM FOR ADAPTIVE ARRAY PROCESSING

(75) Inventor: Joseph G. Desloge, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/396,175

(22) Filed: Sep. 14, 1999

Related U.S. Application Data

(60) Provisional application No. 60/100,291, filed on Sep. 14, 1998.

(51) Int. Cl.
*H04B 1/10* (2006.01)

(52) U.S. Cl. ...................................... 375/350

(58) Field of Classification Search ................ 375/229, 375/232–316, 340, 346, 350; 381/312, 317–318
See application file for complete search history.

(56) References Cited

U.S. PATENT DOCUMENTS

| | | | | |
|---|---|---|---|---|
| 4,931,977 A | * | 6/1990 | Klemes ...................... | 342/378 |
| 5,971,095 A | * | 10/1999 | Ozbek ........................ | 181/112 |
| 6,072,884 A | * | 6/2000 | Kates ......................... | 381/318 |
| 6,219,427 B1 | * | 4/2001 | Kates et al. ................ | 381/312 |

\* cited by examiner

Primary Examiner—Khanh Tran
(74) Attorney, Agent, or Firm—Gauthier & Connors LLP

(57) ABSTRACT

An adaptive multiple-tap frequency domain digital filter processes an input signal vector X from a plurality of spatially separated transducers that detect energy from a plurality of sources including a target energy source and at least one non-target energy source. The filter receives and processes the input signal vector X to attenuate noise from non-target sources and provides an output signal vector Y. Tap weights $W_N$ for the filter are selected by first parameterizing each of the tap weights $W_N$, such that each of the tap weights $W_N$ is characterized by a vector of parameters $\beta_{opt}$, and the solving for each parameter of the vector $\beta_{opt}$ by minimizing the expected power of the array output signal Y. A robustness-control transformation is then applied to the vector p to provide a robust vector $\beta_{opt}$ wherein the robustness-control transformation identifies and reduces target canceling components of the vector $\beta_{opt}$ while preserving non-target canceling components. Finally, the weight vector indicative of the filter tap weights is formed as a function of the vector $\beta_{opt}$. Notably, the present invention separates the robustness constraining process from the beamforming power minimization, in contrast to prior art techniques which combine the robustness constraint into the beamforming power minimization. The present invention uses a direct and flexible robustness control mechanism to yield a beamformer that provides good performance and is robust to a wide variety of adverse conditions.

2 Claims, 15 Drawing Sheets

Contours for $\Omega_i(\beta) = 30°$ (- -) $60°$ (——), and $90°$ (X) for M = 2, 3, 4 and 5 element arrays.

Contours (——), and approximated contours (- -) for M = 3 and $\Omega(\beta_i) = 30°, 40°, 50°,$ and $60°$, with $\beta_i^+$ also indicated (×).

Diagram showing the three modified LENS parameter classification regions for an M=3 element array as according to Equation 3.23 when $R_T$ and $R_J$ are chosen to reflect the $\Omega_T = 30°$ and $\Omega_J = 60°$ contours, respectively.

Four example values of $\beta_{opt,1}$ for two-element array along along with the corresponding LENS robustness regions.

↓

Step 1: Transform to $\beta_{ns,opt}$ [Eq. 5.4]

$$\beta_{ns,opt,i} = j \frac{(\beta\zeta,opt,\,i+j) + \zeta(\beta\zeta,opt,\,i+j)}{(\beta\zeta,opt,\,i+j) - \zeta(\beta\zeta,opt,\,i+j)}$$

↓

Step 2: Standard LENS Robustness Restriction [Eqs. 3.30, 3.29]

$$\beta_{ns,rob,i} = \bar{f}[\beta_{ns,opt,i}]\,\beta_{opt,i}, \text{ where}$$

$$\bar{f}[\beta_{ns,opt,i}] = \begin{cases} 0 & \beta_{ns,opt,i} \in T \\ 1 & \beta_{opt,i} \in J \\ \bar{f}[\beta_{ns,opt,i}] & \beta_{ns,opt,i} \in \overline{TUJ} \end{cases}$$

$$\bar{f}[\beta ns_{opt,i}] = \min\left[\frac{|Re\{\beta ns_{opt,i}\}| - R_J}{R_T - R_J}, \frac{|Im\{\beta ns_{opt,i}\}| - \Lambda R_J}{\Lambda(R_T) - (\Lambda R_J)}\right]$$

↓

Step 3: Transform to $\beta_{\zeta,rob}$ [Eq. 5.4]

$$\beta_{\zeta,rob,i} = j \frac{(\beta ns,rob,\,i+j) + (\beta ns,rob,\,i+j)}{(\beta ns,rob,\,i+j) - (\beta ns,rob,\,i+j)}$$

↓

FIG. 13

LOCATION-ESTIMATING, NULL STEERING (LENS) ALGORITHM FOR ADAPTIVE ARRAY PROCESSING

CROSS REFERENCE TO RELATED APPLICATIONS

This application claims priority from the provisional application designated Ser. No. 60/100,291 filed Sep. 14, 1998 and entitled "Location-Establishing, Null Sterring (LENS) Algorithm for Adaptive Array Processing".

GOVERNMENT RIGHTS

This invention was made with government support under Contract NIH-5R01-DC00270 by the National Institute of Health. The government may have certain rights in the invention.

BACKGROUND OF THE INVENTION

The present invention relates to the field of digital signal processing, and in particular to the field to adaptive digital filters for beamforming transducer arrays.

Many applications (e.g., radar, sonar, satellite communications, background noise reducing hearing aids, etc.) often include a directionally sensitive antenna-array or microphone array (generically a beamforming tranducer array). These beamforming transducer arrays and their associated signal processing are capable of enhancing a desired target source relative to another non-target source (e.g., a jammer/noise source). The enhancements improve the perceived target-to-jammer power ratio (TJR), which, in turn, improves the performance of subsequent, target-based processing.

One application of a beamforming transducer array is for hearing aids. Hearing aid wearers often complain about the corrupting influence of background noise upon their ability to understand a desired target source. Enhancing the target relative to the background noise reduces this problem. Similarly, applications such as satellite communications, radar and sonar also benefit from the directional filtering ability of beamforming transducer arrays. We shall now discuss the basic beamforming problem.

2 BEAMFORMING BACKGROUND

2.1 Basic Beamforming Problem

The overall beamforming goal is to extract a desired target signal from within a field of non-target, jammer signals using an array of spatially-separated sensors. Specifically, beamformers exploit input differences arising from different source directions of arrival to create a 'spatial-filter' that preserves the target source while nulling the jammer sources. FIG. 1 shows the basic beamforming system structure, which filters (convolves) each array input $x_i[n]$, $i=\{0, 1, \ldots, M-1\}$ with a corresponding impulse response $\omega_i[n]$ and sums the resulting signals to form the overall output $y[n]$:

$$y[n] = \sum_{i=0}^{M-1} w_i[n] * x_i[n]. \quad (2.1)$$

Converting Equation 2.1 into the frequency domain and introducing vector notation allows for the beamforming operation to be expressed as an inner product:

$$Y(\omega) = \sum_{i=0}^{M-1} W_i^*(\omega) X_i(\omega) = \underline{W}^H(\omega)\underline{X}(\omega), \quad (2.2)$$

where $x_i[n] \leftrightarrow X_i(w)$, $w_i[n] \leftrightarrow W_i(w)$, $y[n] \leftrightarrow Y(w)$, $X(w)=[X_o(w), \ldots, X_{M-1}(w)]^T$, $W(\omega)=[W_o(\omega), \ldots, W_{M-1}(\omega)]^T$, and $^H$ is the hermitian (complex-conjugate transpose) operation.[1] The main issue involved in the design of a beamforming system is the selection of the array weights $\underline{W}(\omega)$ that yield the desired spatial-filtering behavior. As described in Section 2.3, these weights may be either time-invariant or time-varying. Time-invariant weights typically achieve simple and robust processing, while time-varying weights are often capable of superior performance.

2.2 Beamforming Terminology

Before discussing the beamforming weight-selection process, this section introduces the basic terminology that is used to discuss beamforming systems.

2.2.1 Coordinate System

Beamforming systems use spatially-separated sensors to extract a target source from within a field of jammer sources. The spatial dimension of this task requires a coordinate system to describe both array element and source locations.

FIG. 2 shows the three-dimensional, polar-coordinate triple, $(\rho_o, \theta_o, \Phi_o)$, that corresponds to the cartesian coordinate triple $(x_o, y_o, z_o)$. In this representation, (1) $_o$ is the distance from $(x_o, y_o, z_o)$ to the origin, (2)

$$\theta_0 \in [-\frac{\pi}{2}, \frac{\pi}{2}]$$

in the angle between $(x_o, y_o, z_o)$ and the yz-plane (positive if $x_o>0$ and negative if $x_o<0$), and (3) $\Phi_o \in [-\pi, \pi]$ is the angle between the projection $(0, y_o, z_o)$ of $(x_o, y_o, z_o)$ into the yz-plane and the positive z-axis. The triple $(x_o, y_o, z_o)$ and $\rho_o, \theta_o, \Phi_o)$ are related as follows:

$$\rho_0 = \sqrt{x_0^2 + y_0^2 + z_0^2} \quad (2.3)$$

$$\theta_0 = \tan^{-1}\frac{x_0}{\sqrt{y_0^2 + z_0^2}}$$

$$\phi_0 = \tan^{-1}\frac{y_0}{z_0}$$

This polar coordinate definition is slightly different from traditional polar-coordinate definitions, but it simplifies the analysis of broadside arrays (Section 2.2.2), which are used fro much of this research.

In the analysis of beamformer behavior, it is assumed that all sources are far-field and produce plane waves that propagate across the array, i.e., $\rho=\infty$, which means that $(\theta, \Phi)$ alone specifies source locations. The theoretical target source location is assumed to be known and fixed along the positive z-axis: $(\theta_T, \Phi_T)=(0, 0)$.

2.2.2 Array Configurations

The array elements lie at known, fixed locations within the array environment and may be arranged in any desired configuration. One special type of array is a uniform linear array (ULA), in which the array elements are co-linear and equally-spaced by a distance d. FIG. 3 shows two ULA examples, which are defined relative to a specified target location (along the positive z-axis). For these two configurations, endfire and broadside, the array elements are respectively oriented coaxial with and perpendicular to the target propagation direction.

The simple and regular structure of ULAs allows for straightforward system analysis, and, for this reason, the specific systems that are designed and simulated in the following chapters will have broadside ULA configurations. The coordinate system of Section 2.2.1 is convenient for the broadside ULAs of FIG. 3b, because only the $\theta$ location parameter is needed to describe the impact of a specific source upon the free-field array (due to the cylindrically-symmetric behavior about the array axis).

2.2.3 Source-to-Array Transfer Function, $\underline{H}(\omega, \theta, \Phi)$ The array element locations, the source locations, and the knowledge of the source propagation rules within the array environment allow for the definition of a source-to-array transfer function that relates each source to each array element. Consider a source, $S(\omega, \theta, \Phi)$, located at $(\theta, \Phi)$. This source produces a signal $\tilde{H}_i(\omega, \theta, \Phi)S(\omega, \theta, \Phi)$ at array element i, where $\tilde{H}_i(\omega, \theta, \Phi)$ is the source-to-element transfer function. The overall array input due to $S(\omega, \theta, \Phi)$ is thus $$\underline{X}(\omega) = \begin{bmatrix} X_0(\omega) \\ X_1(\omega) \\ \vdots \\ X_{M-1}(\omega) \end{bmatrix} = \underbrace{\begin{bmatrix} \tilde{H}_0(\omega, \theta, \phi) \\ \tilde{H}_1(\omega, \theta, \phi) \\ \vdots \\ \tilde{H}_{M-1}(\omega, \theta, \phi) \end{bmatrix}}_{\tilde{H}(\omega,\theta,\phi)} S(\omega, \theta, \phi), \quad (2.4)$$

where $\tilde{H}(\omega, \theta, \Phi)$ is the source-to-array transfer function vector. Because beamforming exploits the relative differences between the input sipgnals, the source-to-array transfer functions are usually normalized by $\underline{H}(\omega, \theta, \Phi)$. Defining $H_i(\omega, \theta, \Phi)=\tilde{H}_i(\omega, \theta, \Phi)/\tilde{H}_o(\omega, \theta, \Phi)$, the normalized source-to-array transfer function vector is $$\underline{H}(\omega, \theta, \phi) = \frac{\tilde{H}(\omega, \theta, \phi)}{\tilde{H}_0(\omega, \theta, \phi)} = \begin{bmatrix} 1 \\ H_1(\omega, \theta, \phi) \\ \vdots \\ H_{M-1}(\omega, \theta, \phi) \end{bmatrix}. \quad (2.5)$$

Under the assumption of far-field sources that propagates as lossless plane-waves across the array and that the array is operating in the free-field, it is possible to determine $\underline{H}(\omega, \theta, \Phi)$ explicitly. In this case, the individual-element transfer functions $H_i(\omega, \theta, \Phi)$ are pure delays, since the amplitude does not decay, $$H_i(\omega,\theta,\Phi)=e^{j\omega T_i(\Phi,\theta)}.$$

The delay $t_i(\theta, \Phi)$ is equal to the additional distance, $d_i(\theta, \Phi)$, that the propagating wave travels between elements 0 and i, divided by the propagation velocity c:

$$H_i(\omega, \theta, \phi) = e^{j\omega \frac{d_i(\theta,\phi)}{c}}.$$

The array geometry provides a means for determining the $d_i(\theta, \Phi)$ for a given source location. Note that, since element 0 is used as the reference, $d_o(\omega, \theta, \Phi)=0$, which yields $H_o(\omega, \theta, \Phi)=1$ as desired in Equation 2.5.

For a free-field ULA, each $d_i(\theta, \Phi)$ may be stated in terms of $d_1(\theta, \Phi)$. Specifically, the equal inter-element spacing and the linear array orientation result in $$d_i(\omega, \theta, \Phi)-d_{i-1}(\omega, \theta, \Phi)=d_1(\omega, \theta, \Phi), \text{ I}=\{1,2,\ldots,m-1\}.$$

This reveals that $d_i(\theta, \Phi)=id_1(\theta, \Phi)$, and, since $$\tau_i(\theta, \phi) = \frac{d_i(\theta, \phi)}{c},$$

this yeidls $$\underline{H}(\omega, \theta, \phi) = \begin{bmatrix} 1 \\ e^{j\omega \frac{d_1(\theta,\phi)}{c}} \\ e^{j\omega \frac{2d_1(\theta,\phi)}{c}} \\ \vdots \\ e^{j\omega \frac{(M-1)d_1(\theta,\phi)}{c}} \end{bmatrix} = \quad (2.6)$$

$$\begin{bmatrix} 1 \\ e^{j\omega \tau_1(\theta,\phi)} \\ e^{j\omega 2\tau_1(\theta,\phi)} \\ \vdots \\ e^{j\omega(M-1)\tau_1(\theta,\phi)} \end{bmatrix} = \begin{bmatrix} 1 \\ H_1(\omega, \theta, \phi) \\ H_1(\omega, \theta, \phi)^2 \\ \vdots \\ H_1(\omega, \theta, \phi)^{M-1} \end{bmatrix}.$$

Based on the coordinate system in FIG. 2 and the ULA examples in FIG. 3 the following $d_1(\theta, \Phi)$ values can be determined, Endfire: $d_1(\theta, \Phi)=d \cos\theta\cos\Phi,$ \quad (2.7)

Broadfire: $d_1(\theta, \Phi)=d \sin\theta,$ \quad (2.7)

where d is the inter-element spacing.

2.2.4 Overall Input Signal

The source-to-array tranfer functions allow for the expression of the overall array input as the superposition of the individual-source array inputs. For example, given L sources $S(\omega, \theta_l, \Phi_l)$, $l=\{1,2,\ldots,L\}$, and the corresponding source-to-array transfer functions $H(\omega, \theta_l, \Phi_l)$, the array input is $$\underline{X}(\omega) + \sum_{l=1}^{L} S(\omega, \theta_l, \phi_l)\underline{H}(\omega, \theta_l, \phi_l). \quad (2.8)$$

Since the following beamforming techniques are narrowband and operate only on a narrow band of frequencies, the following discussions supress the explicit ω dependence.

2.3 Beamforming Methods

In order to see how $\underline{W}$ determines a beamformer's spatial filter characteristic, combine Equations 2.2 and 2.8

$$Y = \quad (2.9)$$

$$\underline{W}^H \underline{X} = \underline{W}^H \left[ \sum_{l=1}^{L} S(\theta_l, \phi_l)\underline{H}(\theta_l, \phi_l) \right] = \sum_{l=1}^{L} S(\theta_l, \phi_l) \underbrace{\underline{W}^H \underline{H}(\theta_l, \phi_l)}_{G(\theta_l, \phi_l)}.$$

This output expression reveals that each source $S(\theta_1, \Phi_1)$ in the array input is also present in the array output, but it is scaled by the location-dependent factor known as the directional array response $G(\theta, \Phi) = \underline{W}^H \underline{H}(\theta, \Phi)$. This scaling factor demonstrates the effect of $\underline{W}$ upon a source from the $(\theta, \Phi)$ direction.

The overall spatial-filtering, beamforming goal is to determine a $\underline{W}$ such that $G(\theta, \Phi)=1$ for the target source and $G(\theta, \Phi)=0$ for the non-target, jammer sources. In the special case where the target and jammer source-to-array transfer functions are known [i.e., the target is at $(\theta_T, \Phi_T)$ and the jammers are at known locations $(\theta_{J,k}, \Phi_{J,k})$, k={1,2, ..., M=1}], it is possible to formulate a system of linear equations whose solution achieves this goal:

$$\begin{bmatrix} G(\theta_T, \phi_T) \\ G(\theta_{J,1}, \phi_{J,1}) \\ \vdots \\ G(\theta_{J,M-1}, \phi_{J,M-1}) \end{bmatrix} = \begin{bmatrix} \underline{H}^H(\theta_T, \phi_T) \\ \underline{H}^H(\theta_{J,1}, \phi_{J,1}) \\ \vdots \\ \underline{H}^H(\theta_{J,M-1}, \phi_{J,M-1}) \end{bmatrix} \underline{W} = \begin{bmatrix} 1 \\ 0 \\ \vdots \\ 0 \end{bmatrix}, \quad (2.10)$$

where the equality $G(\theta, \Phi) = \underline{W}^H \underline{H}(\theta, \Phi) = \underline{H}(\theta, \Phi)^H \underline{W}$ has been used.

Equation 2.10 cannot be used for generaly beamforming purposes, since the jammer locations are unknown and, usually, time-varying. Other methods have been developed to generate beamforming weight vectors that meet the desired goal. These techniques fall into two categories:

1. <u>Time-InvariantSystems:</u> in which $\underline{W}$ is fixed and optimize a general performance criterion, such as the array directivity index.
2. <u>Time-VaryingSystems:</u> in which $\underline{W}$ is continually updated to suit the particular beamforming environment.

Time-invariant systems have the advantage of simple implementation and robust operation, but the unchanging nature of these systems requires that the beamforming be optimized to yield generally-good performance in all potential array environments. This requirement prevents these beamformers from achieving the maximum possible level of jammer cancellation that is attainable for the particular environment in which the system is operating. Time-varying systems, on the other hand, have the advantage of continuously updating the beamforming in order to achieve the optimal performance for the particular array environment. This improved performance arises at the cost of more computationally-demanding processing, and these systems may cancel the target under certain conditions.

Since LENS processing is time-varying, this research considers only time-varying systems. The following discussion introduces these systems in three parts. First it presents the simplest concept of optimal beamforming for a given environment and introduces the robustness problems that arise with this system. It continues with a discussion of the traditional, robustness-enhancing modifications to the original, non-robust weight-vector definition. It concludes with a description of some implementations that may be used to approximate these systems.

2.3.1 Traditional, Non-Robust Beamforming

Equation 2.11 describes the traditional, non-robust frequency-domain beamforming weight-vector, which is chosen to minimize the expected output power at each frequency, $E[|Y|^2]$, subject to the constraint of preserving unit gain for the known target-source location:

$$\underline{W}_{NR} = \operatorname*{argmin}_{\underline{W} \in C^M} E[|Y|^2] = \operatorname*{argmin}_{\underline{W} \in C^M} E[\underline{W}^H \underline{X} \underline{X}^H \underline{W}] = \quad (2.11)$$

$$\operatorname*{argmin}_{\underline{W} \in C^M} \underline{W}^H R_{XX} \underline{W}$$

subject to $\underline{H}_{target}^H \underline{W} = 1,$ where $R_{XX} = E[\underline{X}\underline{X}^H]$ is the input covariance matrix and $\underline{H}_{target} = \underline{H}(\theta_T, \Phi_T)$ is the target-to-array transfer function vector. Solving this problem via Lagrange multipliers yields the solution:

$$\underline{W}_{NR} = \frac{R_{XX}^{-1} \underline{H}_{target}}{\underline{H}_{target}^H R_{XX} \underline{H}_{target}}. \quad (2.12)$$

In beamforming literature, this weight vector is preferred to by several different names, including the Maximum Liklihood Method (MLM) weight vector and the Minumum-Variance, Distortionless Response (MVDR) weight vector. This research uses a third appelation, NR, which reflects that this is the baseline, non-robust situation of the Constrained, Minimum-Variance (CMV) weight vector [described in Section 2.3.2].

This definition of the optimal beamforming weight vector seems logical—by minimizing the expected output power while preserving the target signal, the weight vector must be attenuating the jammer sources in the environment. This system works well under ideal conditions, but, unfortunately, problems arise under more realistic conditions. These problems result from discrepancies between the assumed and actual target-to-array transfer function vectors: $\underline{H}_{target}$ and $\underline{\hat{H}}_{target}$.

The primary effect of the discrepancies between $\underline{H}_{target}$ and $\underline{\hat{H}}_{target}$ is that they can result in cancellation of the target signal—an obviously undesirable effect in any beamforming system. To see how this behavior arises, consider the case when only the target is active within the array environment.

If $\underline{H}_{target}$ and $\hat{\underline{H}}_{target}$ are different, then it is possible for the beamformer to find $\underline{H}_{NR}$ such that $\underline{H}^H_{target}\underline{W}_{NR}<1$, $\hat{\underline{H}}^H_{target}\underline{W}_{NR}=0$.

In other words, the beamformer can completely eliminate the actual target signal while still preserving the assumed target-to-array transfer function.

Generalizing this result to situations in which both targets and jammer sources are present, the following behavior is observed. When the target is weak relative to the jammers, i.e., the TJR (target-to-jammer power ratio) is low, then the jammer power dominates the beamforming, and the system cancels the jammer singals. When the target is strong relative to the jammers, i.e., the TJR is high, then the target dominates the beamforming and the target cancellations described above may happen.

The most obvious means of avoiding target cancellation would be to obtain a better target-to-array transfer function estimate [i.e., to reduce the discrepancies between $\underline{H}_{target}$ and $\hat{\underline{H}}_{target}$] for use in Equation 2.11. Unfortunately, this is not an easy task, given the following causes of discrepancies between $\underline{H}_{target}$ and $\hat{\underline{H}}_{target}$:

1. ArrayMis-Alignment/Mis-Steer: in which the target is not located exactly at its assumed location, e.g., it might be near-field or slightly off center.

2. ElementPlacementErrors: in which the array elements are not located at exactly the specified array locations.

3. ElementGainMismatch: in which the array elements have unequal gains.

4. Non-Free-FieldArrayOperation: in which objects that are located near the array scatter the incoming wave-fronts, e.g., a hearing-aid array mounted on the head.

5. Multipath-Propgation/Reverberation: in which the target signal arrives from both the actual target location and non-target locations (wall reflections).

These effects are difficult to estimate and usually change over time, which renders it impossible to maintain a highly accurate estimate of $\underline{H}_{target}$ in practice. For this reason, modifications have beem made to the definition of the optimal beamforming weight vector of Equation 2.11 in order to increase its overall robustness to target-cancellation. The following section describes one class of modifications.

2.3.2 Robust Processing: CMV Beamforming

Constrained, Minimum-Variance (CMV) beamforming is a classic approach to increasing beamforming robustness. It operates by imposing additional weight-vector constraints to the traditional, non-robust optimization of Equation 2.11:

$$\underline{W}_{CMV} = \operatorname*{argmin}_{\underline{W} \in C^M} \underline{W}^H R_{XX} \underline{W} \qquad (2.13)$$

subject to: $C^H \underline{W} = \underline{g}$ and $\underline{W}^H \underline{W} \leq \delta^{-2}$, where (C,g) describes a set of linear constraints (that must include preservation of the assumed target-to-array transfer function, $\underline{H}^H_{target}\underline{W}=1$) upon the weight vector and $\delta^{-2}$ is a quadratic constrain on the weight vector norm. Note that CMV beamforing reduces to traditional, non-robust beamforming [Equation 2.3.1] when $C=\underline{H}_{target}$, $\underline{g}=1$, and $\delta^{-2}=\infty$. Additionally, when $\delta^{-2}=\infty$, then no quadratic constraint is imposed upon the weight vector and CMV beamforming reduces to linearly-constrained, minimum-variance (LCMV) beamforming.

The solution to Equation 2.13 may be written as:

$$\underline{W}_{CMV}=(R_{XX}+\epsilon I)^{-1}C[C^H(R_{XX}+\epsilon I)^{-1}C]^{-1}\underline{g}. \qquad (2.14)$$

When there is no quadratic constraint, i.e., when $\delta^{-2}=\infty$ such as for traditional, non-robust and LCMV beamforming as described above, this solution is closed-form with $\epsilon=0$. When the quadratic constraint is active, however, this solution is not closed-form and $\epsilon$ must be adjusted iteratively until $\underline{W}^H\underline{W} \leq \delta^{-2}$.

The constraints $C^H\underline{W}=\underline{g}$ and $\underline{W}^H\underline{W}\leq\delta^{-2}$ discourage target cancellation in the following manner. The linear constraint $C^H\underline{W}=\underline{g}$ imposes restrictions on the behavior of the directional array gain $G(\theta, \Phi)$. For example, the required constraint of $\underline{H}^H_{target}\underline{W}=1$ ensures that the assumed target gain is unity: $G(\theta_t, \Phi_T)=1$. Derivative constraints may be added to force $G(\theta, \Phi)$ to have a flat derivative about the assumed target location, which prevents the system from canceling targets that are close to the assumed target location. Alternatively, eigenvector constraints that keep $G(\theta,\Phi)$ 'near' a desired behavior about the assumed target location may be used. In general, the linear constraints are desinged to increase system robustness to highly structured deviations (e.g., array misalignment) between the actual and assumed target-to-array transfer function.

The norm constraint, $\underline{W}^H\underline{W}\leq\delta^{-2}$, imposes restrictions on the white-noise-gain of the system. Specifically, the white noise gain, $G_w$, measures the improvement in the output relative to the input TJR (target-to-jammer power ratio) when no directional jammers are present and only uncorrelated noise is introduced at each array element:

$$G_\omega = \frac{|\underline{H}^H_{target}\underline{W}|^2}{\underline{W}^H\underline{W}} = \frac{1}{\underline{W}^H\underline{W}}, \qquad (2.15)$$

where the fact that $\underline{H}^H_{target}\underline{W}=1$ has been used. By maintaining $\underline{W}^H\underline{W}\leq\delta^{-2}$, then $G_w\geq\delta^2$, which guarantees a minimum level of beamforming improvement, even in the presence of uncorrelated sensor noise. This norm constraint increases system robustness to factors such as array-element placement error, which are independent and may be regarded as additive uncorrelated noise at the array input.

2.3.3 Traditional Implementations

In general, the array environment and input covariance matrix are unknown and time-varying, which prevents direct solution for the optimal CMV weight vector as described in Equation 2.13. Approaches have been designed, however, that approximate the optimal solution and that track the changing array environment. This section introduces three such implementations. The first two implementations are possible only when $\delta^{-2}=\infty$, such as for traditional non-robust and LCMV beam-forming sub-classes of CMV beamforming described above. The third technique is more general and may be used with an CMV formulation.

All implementations use a temporal stream of array-input observations, $\{\underline{X}^{(l)}\}$, to derive a corresponding temporal stream of beamforming weight vectors, $\{\underline{W}^{(l)}_{CMV}\}$. For the broadband processing simulated in much of this research, the narrowband $\underline{X}^{(l)}$ arise through block FFT processing on the broadband input.

Direct Matrix Inversion: In the absence of a weight vector norm constraint, i.e., when $\delta^{-2} = \infty$, the solution of Equation 2.14 is closed form. In this case, $\underline{W}^{(l)}{}_{CMV}$ may be obtained by forming an input-covariance estimate $\hat{R}^{(l)}{}_{XX}$ and using this estimate in Equation 2.14. This method is known as the Direct Matrix Inversion or DMI method, because it involves the inversion of the estimated covariance matrix. The main advantage of this implementation is its relatively fast adaptation time to a changing array environment: adaptation time is governed entirely by the delays associated with the covariance matrix estimation process and are independent of the array environment. Unfortunately, this fast adaptation comes at the cost of matrix inversions, which can be computationally expensive [$O(M^3)$ operations].

Frost Processing: An alternative implementation to the DMI implementation, also for the special case when $\delta^{-2} = \infty$, is a Least-Mean-Squared (LMS) based adaptive approach that uses a gradient search to converge upon the optimal beamforming weight vector. Specifically, the weight vector follows the gradient towards minimal output power, but it is projected back into the constraint subspace (defined by $C^H \underline{W} = \underline{g}$) at each iteration:

$$\underline{W}_{CMV}^{(l+1)} = \underline{W}_c + \hat{P}_c[I - \mu X^{(l)} X^{(l)H}] \underline{W}_{CMV}^{(l)}, \quad (2.16)$$

where $$\underline{W}_c = C(C^H C)^{-1} \underline{g} \text{ and } \hat{P}_c = I - C(C^H C)^{-1} C^H.$$

This processing has the advantage of being less complex [$O(M^2)$ operations] to implement than DMI, but this complexity advantage comes at the cost of longer adaptation times: adaptation time is proportional to $$\frac{1}{\lambda_{min}},$$

where $\lambda_{min}$ is the smallest eigenvalue of the underlying input $R_{XX}$, which means that certain array environments can exhibit very long adaptation times. Details of this technique are set forth in the paper entitled "An Algorithm for Linearly Constrained Adaptive Array Processing", Proc. IEEE, 60:926-935, August, 1972, O. L. Frost.

Scaled Projection Algorithm: The processing set forth above may be altered yield an adaptive beamformer implementation that includes the weight vector norm constraint, $\underline{W}^H \underline{W} \leq \delta^{-2}$. In this case, the basic Frost algorithm is used, but the weight vector is restricted to obey $\underline{W}^H \underline{W} \leq \delta^{-2}$ at each step:

$$\text{Step 1: } \underline{V}^{(l+1)} = \bar{P}_c[\underline{V}^{(l)} = \mu \underline{X}^{(l)} \underline{X}^{(l)H} \underline{W}_{CMV}^{(l)}] \quad (2.17)$$

$$\text{Step 2: } \underline{V}^{(l+1)} = \begin{cases} \underline{V}^{(l+1)}, & \underline{V}^{(l+1)H} \underline{V}^{(l+1)} \leq b^2 \\ \dfrac{b \underline{V}^{(l+1)}}{|\underline{V}^{(l+1)}|}, & \underline{V}^{(l+1)H} \underline{V}^{(l+1)} > b^2 \end{cases}$$

$$\text{Step 3: } \underline{W}_{CMV}^{(l+1)} = \underline{W}_c + \underline{V}_{l+1}$$

where
$\underline{W}_c = C(C^H C)^{-1} \underline{g}$, $\bar{P}_c = I - C(C^H C)^{-1} C$,
and $b^2 = \delta^{-2} - \underline{g}^H (C^H C)^{-1} \underline{g}$.

As with Frost processing, this processing has the advantage of being relatively simple to implement [$O(M^2)$ operations] but it may exhibit long adaptation times.

As set forth above, a significant about of care (i.e., constraints) must be taken when defining the optimal beamforming weight vector in order to yield a solution that is robust to situations that may cause target cancellation. The CMV definition provides one possible solution to this problem, but it suffers from some disadvantages.

1. The CMV constraints are indirect—their impact upon the beamforming performance and their performance of target-cancellation can be difficult to understand. This renders the overall constraint-selection process confusing.

2. Each linear CMV constraint in (C, g) reduces the beamformer degrees of freedom by one. Under good beamforming conditions, e.g., when the TJR is low, this reduction in the degrees of freedom limits the potential jammer cancellation.

Therefore, there is a need for a robustness-control mechanism, which yields a system that has direct and flexible control over the beamforming process.

SUMMARY OF THE INVENTION

Briefly, according to the present invention, an adaptive multi-tap frequency domain digital filter processes an input signal vector X from a plurality of spatially separated transducers that detect energy from a plurality of sources including a target energy source and at least one non-target energy source. The filter receives and processes the input signal vector X to attenuate noise from non-target soucres and provides an output signal vector Y. Tap weights $W_N$ for filter are selected by first parameterizing each of the tap weights $W_N$ such that each of the tap weights $W_N$ is characterized by a vector of parameters $\underline{\beta}_{opt}$, and the solving for each parameter of the vector $\underline{\beta}_{opt}$ by minimizing the expected power of the array output signal Y. A robustness-control transformation is then applied to the vector $\underline{\beta}_{opt}$ to provide a robust vector $\underline{\beta}_{rob}$, wherein the robustness-control transformation identifies and reduces target canceling components of the vector $\underline{\beta}_{opt}$ while preserving non-target canceling components. Finally, the weight vector indicative of the filter tap weights is formed as a function of the vector $\underline{\beta}_{rob}$.

The tap weight selection technique of the present invention preferably executes in real-time. The technique may be used with transducer arrays such as microphones (e.g., hearing aides, sonar processing, etc. . . .) and radar receivers where it is desirable to attenuate signal contributions associated with non-target signal sources.

Beam forming parameterization identifies parameters of the vector $\underline{\beta}_{opt}$ that describe the nulling behavior of the tap weights $W_N$.

The present invention uses a direct and flexible robustness control mechanism to yield a beamformer that provides good performance and is robust to a wide variety of adverse conditions. Notably, the present invention includes a novel robustness-control mechanism, which parameterizes the beamforming problem and yields a system that has direct and more flexible control over the beamforming process.

Advantageously, selecting the tap weight of the adaptive filter according to the present invention nulls (i.e., attenuates) signal components associated with non-target noise sources, while retaining signal components associated with a desired target source(s).

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 13 is a flow chart illustration of alternative embodiment processing steps according to the present invention;

DETAILED DESCRIPTION OF THE INVENTION

3 LENS Beamforming Processing

Figure 1:
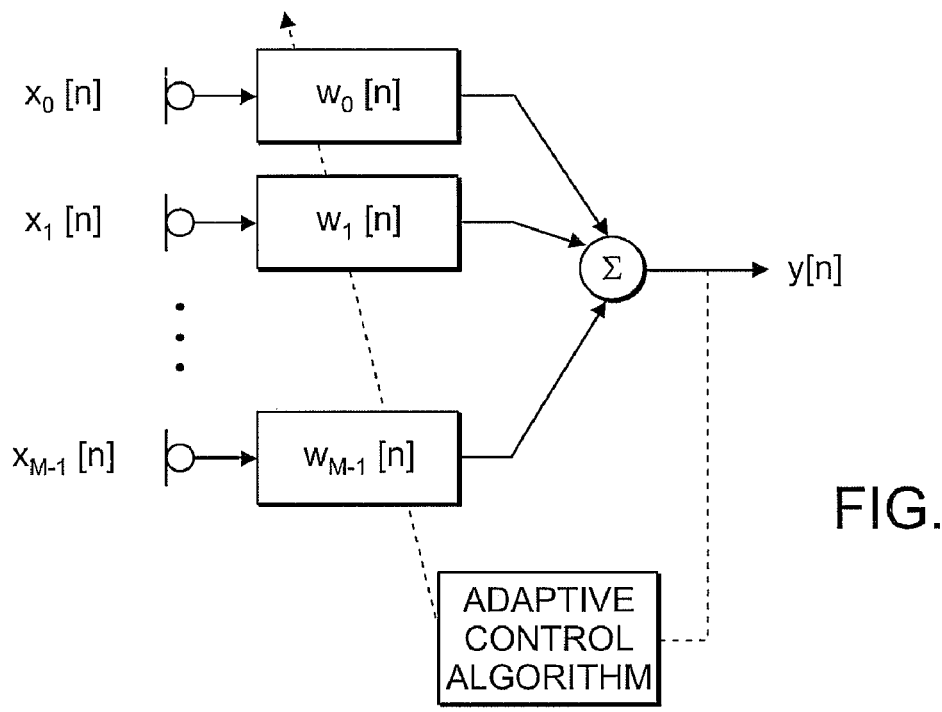
FIG. 1 is a block diagram illustration of a beamforming array.
Figure 2:
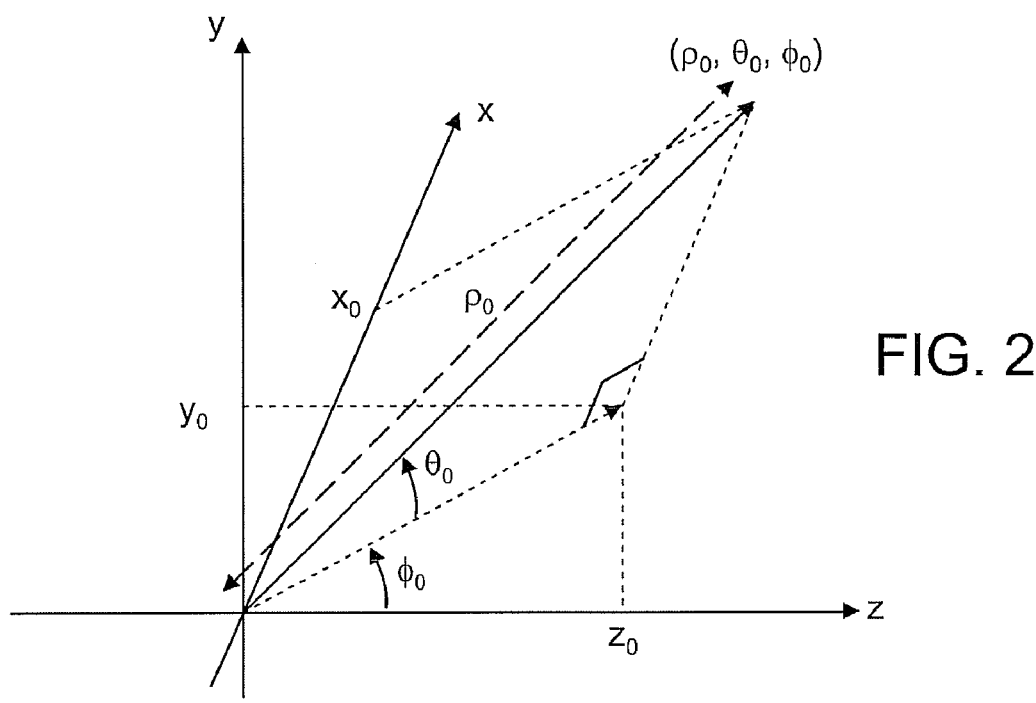
FIG. 2 is a plot of a coordinate system.
Figure 3A:
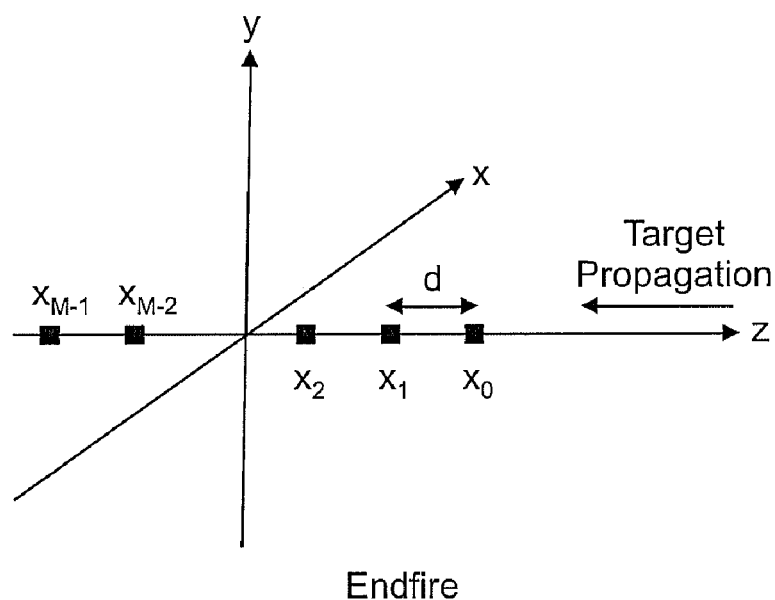
FIGS. 3A and 3B (collectively FIG. 3) are simplified pictorial illustrations of two uniform linear array (ULA) configurations with respect to a target.
Figure 3B:
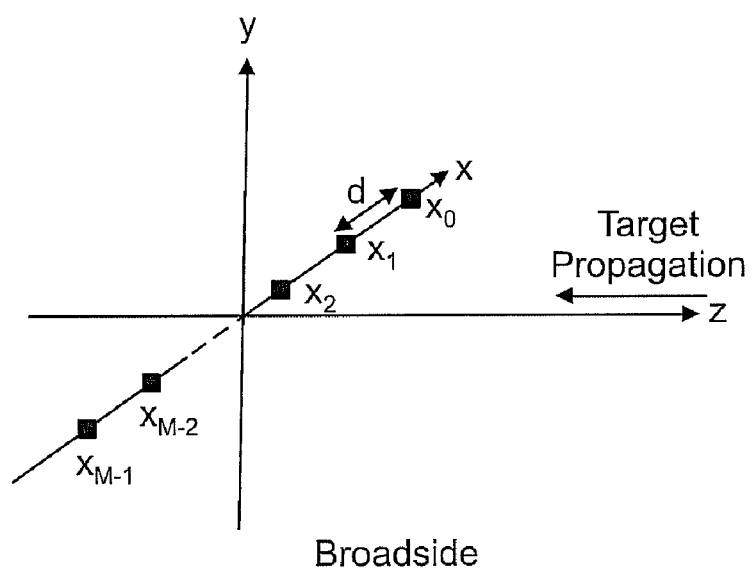

The present invention is directed to a beamforming technique that modifies traditional non-robust beamforming to increase beamforming robustness by preventing target cancellation. Significantly, unlike the prior art, the present invention solves for the robust weight vector indirectly by dividing the beamforming process into three components/steps.

Like CMV beamforming [Section 2.3.2], Location-Estimating, Null-Sterring (LENS) beamforming modifies traditional, non-robust beamforming [Section 2.3.1] in an attempt to increase beamforming robustness by preventing target cancellation. LENS differs from CMV processing however, in that it does not solve for a robust beamforming weight vector directly. Instead, it solves for the robust weight vector indirectly by dividing the beamforming process into three components:

1. Estimation of the optimal LENS parameter set, $\underline{\beta}_{opt}$, that describes the traditional, non-robust beamforming problem.

2. Transformation of $\underline{\beta}_{opt}$ into a 'robust' parameter set, $\underline{\beta}_{rob}$, that is designed to ensure robust beamforming adn to prevent target cancellation.

3. Use of $\underline{\beta}_{rob}$ to generate a final beamforming weight vector.

It should be noted that LENS processing assumes that $\underline{H}_{target}=[1,1,\ldots,1]^T=1$. This target-to-array transfer functions arises naturally for broadside ULSs [Section 2.2.2]. For more general arrays, it may be realized by sclaing each array input i by the steering factor $$\frac{1}{\{\underline{H}_{target}\}_i},$$

where $\{\underline{H}_{target}\}_i$ is the $i^{th}$ element $\underline{H}_{target}$.

The primary advantage of the LENS parameterization is that it allows for the use of an innovative and direct method of beamforming control. Consider as an example Uniform Linear Arrays (ULAs), for which each parameter $\beta_{opt,i}$ in $\underline{\beta}_{opt}$ determines a beamforming null location in the array environment [Section 3.3.1]. In the process of transforming $\underline{\beta}_{opt}$ into $\underline{\beta}_{rob}$, it is possible to control where the final beamforming weight vector will place its nulss [Section 3.3.2] and to prevent target cancellation by restricting these nulls to be a certain angular distance away from the assumed target location. (It is this manifestation of the algorithm that leads to the Location-Estimating, Null-Steering appelation.).

This chapter develops the basic components of LENS beamforming. It begins by introducing the the LENS weight vector and parameter set. It then determines the optimum LENS parameter set to describe traditional, non-robust beamforming and defines the LENS robustness transformation. It concludes by drawing these componetns together into the overall, general LENS algorithm.

3.1 The LENS Beamforming Weight Vector

The key componet of LENS processing is the LENS beamforming weight vector, $\underline{W}_{LENS,M}(\underline{\beta})$. For an M-element array, this weight vector is determined from the M−1 LENS parameters, $\underline{\beta}=[\beta_1,\beta_2,\ldots,\beta_{M-1}]$, as follows:

$$\underline{W}_{LENS,M}(\underline{\beta})^H=(\tfrac{1}{2})^{M-1}[(1-j\beta_1)(1+j\beta_1)]^* \\ [(1-j\beta_2)(1+j\beta_2)]^* \ldots * [(1-j\beta_{M-1})(1+j\beta_{M-1})], \qquad (3.1)$$

where the '*' operation denotes row vector convolution. It turns out that the LENS parameters $\underline{\beta}$ provide a convenient description of the beamforming that is realized by $\underline{W}_{LENS,M}(\underline{\beta})$ and, consequently, they may be used to control the beamforming and to prevent target cancellation.

In order to understand how $\underline{w}_{LNES,M}(\underline{\beta})$ arises and to obtain a 'first look' at the relationship between $\underline{\beta}$ and $\underline{W}_{LENS,M}(\underline{\beta})$, consider the two-element $\underline{W}_{LENS,2}(\beta_1)$;

$$\underline{W}_{LENS,2}(\beta_1)^H = \left[\frac{1-j\beta_1}{2} \frac{1+j\beta_1}{2}\right]. \qquad (3.2)$$

Defining ψ such that $$\psi = \frac{\beta_1 + j}{\beta_2 - j} \Leftrightarrow \beta_1 = j\frac{\psi + 1}{\psi - 1}, \quad (3.3)$$

where both ψ and $\beta_1$ may be complex, and substituting into $\underline{W}_{LENS,2}(\beta_1)$ yields $$W_{LENS,2}(\beta_1)^H = \begin{bmatrix} \frac{-\psi}{1-\psi} & \frac{1}{1-\psi} \end{bmatrix},$$

where $\underline{W}_{LENS,2}(\beta_1)^H\underline{H}_{target}=1$ and $\underline{W}_{LENS,2}(\beta_1)^H\underline{H}_\psi=0$, which $$H_\psi = \begin{bmatrix} 1 \\ \psi \end{bmatrix}.$$

The one-to-one relationship between $\beta_1$ and ψ shows that $\beta_1$ completely describes the nulling behavior of $\underline{W}_{LENS,M}(\underline{\beta})$.

The precise nulling behavior depends upon the actual source-to-array transfer functions $\underline{H}(\theta, \Phi)$ for the array in question. Consider the special case of far-field sources, for which the source-to-array transfer functions are given by Equation 2.6:

$$H(\theta, \phi) = \begin{bmatrix} 1 \\ e^{j\omega\tau(\theta,\phi)} \end{bmatrix},$$

By equating $\psi = e^{j\int r(\theta,\Phi)}$ and substituting into Equation 3.3, when $\underline{W}_{LENS,M}(\underline{\beta})$ clearly nulss source locations (θ, Φ) that satisfy:

$$\beta_1 = j\frac{e^{j\omega\tau(\theta,\phi)}+1}{e^{j\omega\tau(\theta,\phi)}-1} = j\frac{e^{j\frac{\omega\tau(\theta,\phi)}{2}}+e^{-j\frac{\omega\tau(\theta,\phi)}{2}}}{e^{j\frac{\omega\tau(\theta,\phi)}{2}}-e^{-j\frac{\omega\tau(\theta,\phi)}{2}}} = \cot\left(\frac{\omega\tau(\theta,\phi)}{2}\right). \quad (3.4)$$

In this special case, since T(θ,Φ) is real, $\beta_1$ is also real. As discussed in Section 3.3.1, for general M-element ULA architectures with far-field sources, each LENS parameter $\beta_i$ determines one beamforming null location through a similar relation to Equation 3.4. For more general non-ULA array architectures and for near-field sources, the relationship is more complex.

Figure 4:
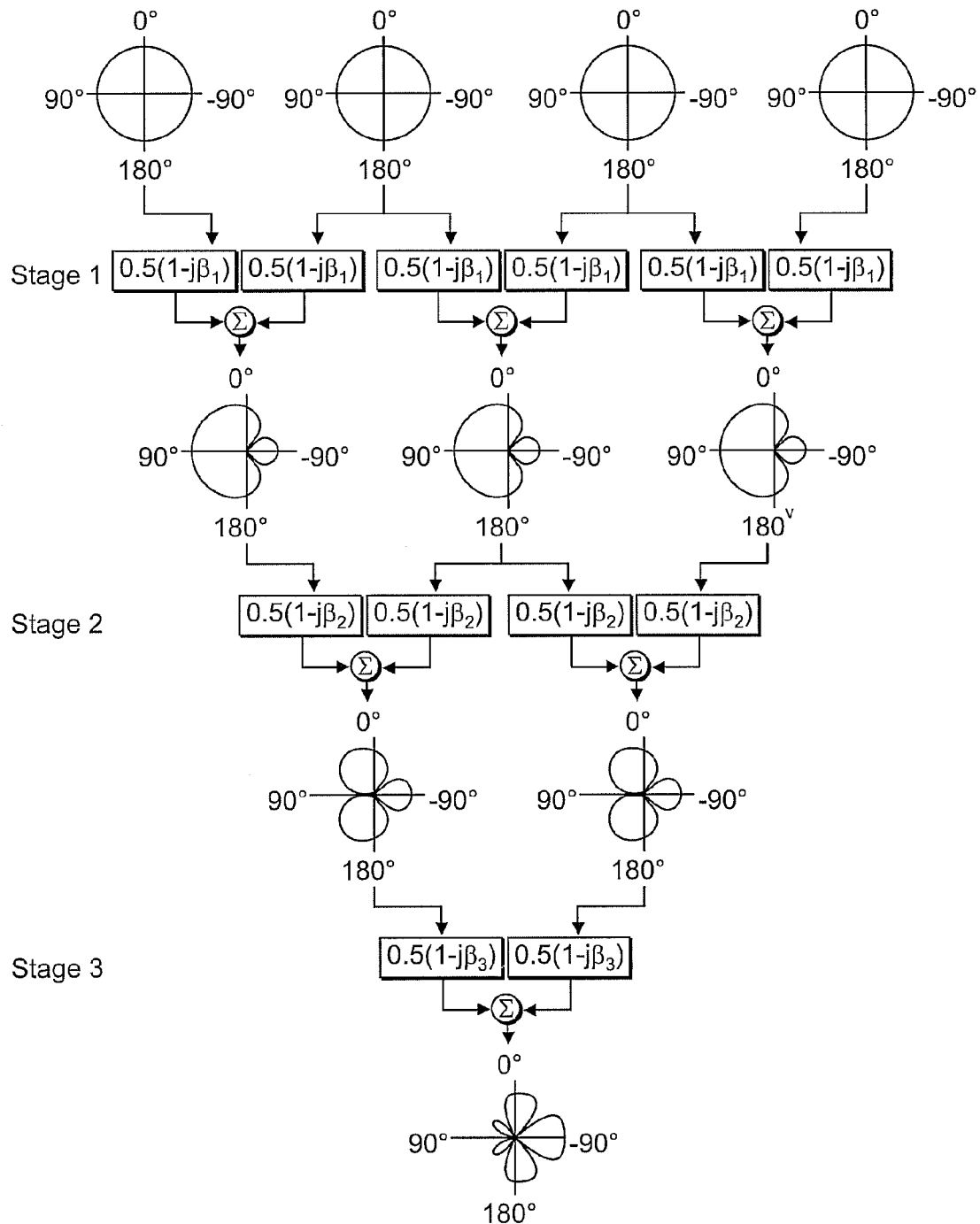
FIG. 4 is a block diagram interpretation of the processing according to the present invention for a four element ULA.

The iterated-convolution, M-element LENS weight vector; $\underline{W}_{LENS,M}(\underline{\beta})$, may be interpreted as a cascade of the two-element LENS weight vectors [Equation 3.2]. FIG. 4 shows this cascade for the special case of a ULA array architecture with far-field sources, for which each LENS parameter and; consequently, each stage in the cascade produces one null in the array directional response [Section 3.3.1].

3.1.1 LENS Weight Vector: a Re-Formulation

The LENS beamforming weight vector $\underline{W}_{LENS,M}(\underline{\beta})$ may be re-expressed in a manner that simplifies the analysis of the LENS algorithm. It can be shown that $\underline{W}_{LENS,M}(\underline{\beta})$ is equal to the linear transformation $T_M$ of another vector $\underline{U}_{LNES,M}(\underline{\beta})$:

$$\underline{W}_{LENS,M}(\underline{\beta})^H = \underline{U}_{LENS,M}(\underline{\beta})^H T_M^H, \quad (3.5)$$

where $\underline{U}_{LENS,M}(\underline{\beta})$ is defined as $$\underline{U}_{LENS,M}(\underline{\beta})^H = (\tfrac{1}{2})^{M-1}[1\ \beta_1]^*[1\ \beta_2]^* \cdots *[1\ \beta_{M-1}], \quad (3.6)$$

and $T_M$ is given by $$T_M^H = \underbrace{\begin{bmatrix} [1\ 1] & * & [1\ 1] & * & \cdots & * & [1\ 1] & * & [1\ 1] \\ [1\ 1] & * & [1\ 1] & * & \cdots & * & [1\ 1] & * & [-j\ j] \\ \vdots & & \vdots & & & & \vdots & & \\ [1\ 1] & * & [-j\ j] & * & \cdots & * & [-j\ j] & * & [-j\ j] \\ [-j\ j] & * & [-j\ j] & * & \cdots & * & [-j\ j] & * & [-j\ j] \end{bmatrix}}_{k-1\ \text{pairs per row}}. \quad (3.7)$$

3.2 Optimal Beamforming Re-Expressed as LENS

The LENS weight vector allows for the LENS parameterization of traditional, non-robust beamforming [Section 2.3.1]. Specifically, define $\underline{\beta}_{opt}$ to minimize the expected power in the LENS array output signal $Y=\underline{W}_{LENS,M}(\underline{\beta})^H X$:

$$\underline{\beta}_{opt} = \underset{\underline{\beta}\in C^{M-1}}{\operatorname{argmin}} E[|Y(\underline{\beta})|^2] = \underset{\underline{\beta}\in C^{M-1}}{\operatorname{argmin}} \underline{W}_{LENS,M}(\underline{\beta})^H R_{XX} \underline{W}_{LENS,M}(\underline{\beta}). \quad (3.8)$$

This $\underline{\beta}_{opt}$ yields a $\underline{W}_{LENS,M}(\underline{\beta}_{opt})$ that is equal to the traditional, non-robust $\underline{W}_{NR}$ from Equation 2.11. To see why this is so, consider the following proof.

Given that $\underline{\beta}_{opt}$ satifies Equation 3.8, then $\underline{W}_{LENS,M}(\underline{\beta}_{opt})=\underline{W}_{NR}$, where $\underline{W}_{NR}$ satisifes Equation 2.11 in the case where steering delays have been applied to the array so that $\underline{H}_{target}=1$:

$$\underline{W}_{NR} = \underset{\underline{W}\in C^{M-}}{\operatorname{argmin}} \underline{W}^H R_{XX} \underline{W} \quad (3.9)$$

subject to: $\underline{1}^H \underline{W} = 1$.

Define the set $\mathcal{A}$ of M-dimensional beamforming weight vectors that are represented by $\underline{W}_{LENS,M}(\underline{\beta})$ as $\underline{\beta}$ spans the space of M−1-dimensional complex vectors, $C_{M-}1$:

$$\mathcal{A}=\{\underline{W}_{LENS,M}(\underline{\beta})\in C^M | \underline{\beta} \in C^{M-1}\}.$$

It can be shown that $\mathcal{A}$ is equivalent to the set $\mathcal{B}$ of all M-dimensional complex vector $\underline{W}$ that sum to 1:

$$\mathcal{B}=\{\underline{W}\in C^M | \underline{1}^H\underline{W}=1\},$$

where $\underline{1}=[1, 1, \ldots, 1]^T$. Hence $\mathcal{A}=\mathcal{B}$.

Using the set $\mathcal{B}$, Equation 3.9 may be re-written as:

$$\underline{W}_{NR} = \underset{\underline{W}\in C^M}{\operatorname{argmin}} \underline{W}^H R_{XX} \underline{W},$$

where $\underline{W}$ clearly varies over the entire set $\mathcal{B}$ for the optimization. Repeating Equation 3.8, the optimal LENS parameter set is:

$$\underline{\beta}_{opt} = \operatorname*{argmin}_{\underline{\beta} \in C^{M-1}} \underline{W}_{LENS,M}(\underline{\beta})^H R_{XX} \underline{W}_{LENS,M}(\underline{\beta}),$$

where $\underline{W}_{LENS,M}(\underline{\beta})$ varies over the entire set $\mathcal{A}$ for the optimization.

Since (1) $\underline{W}$ varies over $\mathcal{B}$ (2) $\underline{W}_{LENS,M}(\underline{\beta})$ varies over $\mathcal{A}$, and (3) $\mathcal{A} = \mathcal{B}$ then $$\underline{W}_{LENS,M}(\underline{\beta}_{opt}) = \underline{W}_{NR}.$$

3.2.1 Closed-Form LENS Solution

The equality of $\underline{W}_{LENS,M}(\underline{\beta})$ and $\underline{W}_{NR}$, as described above, and the LENS reformulation from Section 3.1.1 may be combined to yield a closed-form expression for $\underline{\beta}_{opt}$. Specifically, using the closed-form solution for $\underline{W}_{NR}$ [Equation 2.12] and recalling that $\underline{H}_{target} = \underline{1}$, then $$\underline{W}_{LENS,M}(\underline{\beta}_{opt})^H = \underline{W}_{NR}^H = \left(\frac{R_{XX}^{-1} \underline{1}}{\underline{1}^H R_{XX}^{-1} \underline{1}}\right)^H = \frac{\underline{1}^H R_{XX}^{-1}}{\underline{1}^H R_{XX}^{-1} \underline{1}}.$$

Now, recall that $\underline{W}_{LNES,M}(\underline{\beta}_{opt})^H = \underline{U}_{LENS,M}(\underline{\beta}_{opt})^H T^H_M$ [Equation 3.5] and it is known that $Q_M = T^{-1}_M$ exists, which leads to $$\underline{U}_{LENS,M}(\underline{\beta}_{opt})^H = \underline{W}_{LENS,M}(\underline{\beta}_{opt})^H Q^H_M = \frac{\underline{1}^H R_{XX}^{-1} Q^H_M}{\underline{1}^H R_{XX}^{-1} \underline{1}}.$$

Finally, use the fact that the elements of the vector $\underline{U}_{LENS,M}(\underline{\beta})^H$ forms the coefficients of a polynominal that has roots as $-\beta_i$ [Appendix B] to obtain the expression of $\underline{\beta}_{opt}$:

$$\underline{\beta}_{opt} = -\operatorname{roots}(\underline{U}_{LENS,M}(\underline{\beta}_{opt})^H) = -\operatorname{roots}\left(\frac{\underline{1}^H R_{XX}^{-1} Q^H_M}{\underline{1}^H R_{XX}^{-1} \underline{1}}\right). \quad (3.10)$$

Equation 3.10 reveals that $\underline{\beta}_{opt}$ may be obtained by inverting $R_{XX}$ and performing a polynominal root solution on the polynominal described by $\underline{U}_{LENS,M}(\underline{\beta})$.

3.3 Transforming $\underline{\beta}_{opt}$ into $\underline{\beta}_{rob}$

As shown above, $\underline{\beta}_{opt}$ is a parameterization of the traditional, non-robust beam-forming of Section 2.3.1. This means that a beamformer that uses $\underline{W}_{LENS,M}(\underline{\beta}_{opt})$ would exhibit all of the non-robust, target-canceling characteristics of the original, non-robust approach. The key feature that differentiates LENS beamforming from traditional, non-robust beamforming is the robustness-control transformation of $\underline{\beta}_{opt}$ into $\underline{\beta}_{rob}$. This transformation uses the relationship between $\underline{\beta}$ and the nulling behavior of $\underline{W}_{LENS,M}(\underline{\beta})$ to identify and elminate any target-canceling components of $\underline{\beta}_{opt}$ while preserving the jammer-canceling components.

Figure 5:
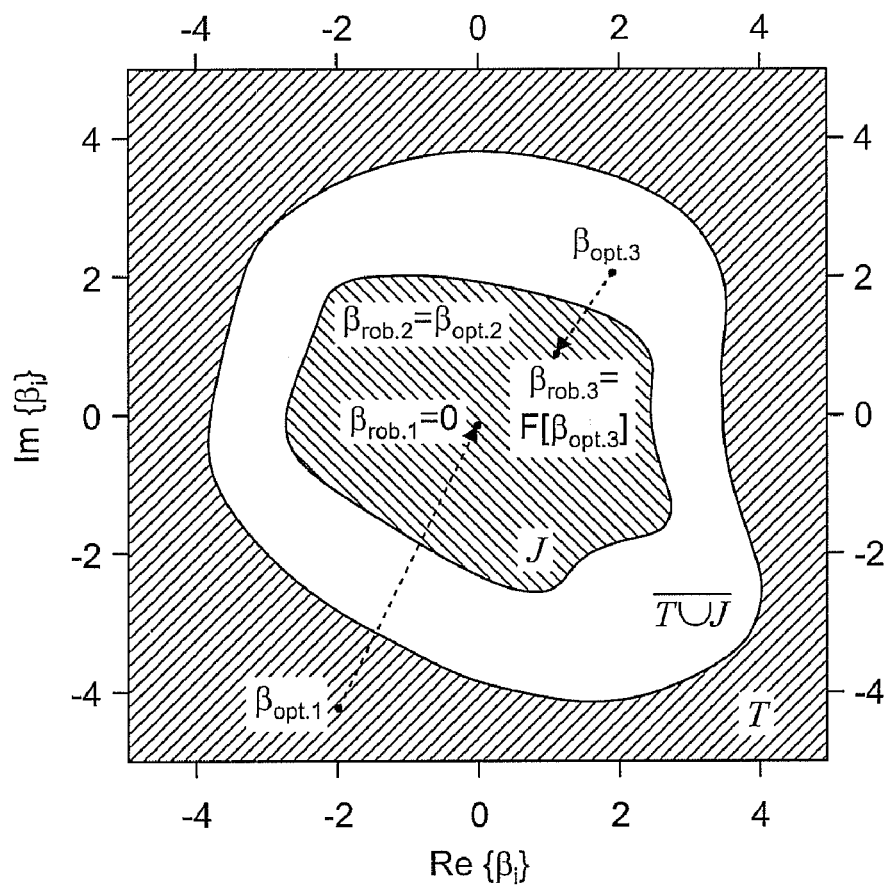
FIG. 5 is a plot of the transformation of $\beta_{opt,j}$ to $\beta_{rob,j}$.

The robustness trransformation is achieved by classifying each optimal LENS parameter $\beta_{opt,i}$ into one of three sets and then transforming it according to the rule:

$$\beta_{rob,i} = \begin{cases} 0 & \beta_{opt,i} \in T \\ \beta_{opt,i} & \beta_{opt,i} \in J \\ F[\beta_{opt,i}] & \beta_{opt,i} \in \overline{T \cup J} \end{cases} \quad (3.11)$$

where T and J are the 'target-canceling' and 'jammer-canceling' LENS-parameter regions, respectively. FIG. 5 demonstrates this process graphically for parameters in each of the three classes. For $\beta_{opt,1} \in T$, the LENS parameter contains primarily target-canceling information, and so $\beta_{rob,i}$ is set to 0, which is a 'safe' non-target-canceling parameter value. For $\beta_{opt,2} \in J$, the LENS parameter contains primialy jammer-canceling information, and so $\beta_{rob,i}$ is set to the unaltered $\beta_{opt,i}$. For $\beta_{opt,3} \in \overline{T \cup J}$, the LENS parameter is in an intermediate region and $\beta_{rob,i}$ is set to $F[\beta_{opt,i}]$, which is a smooth transition between the $\beta_{opt,i} \in T$ and $\beta_{opt,i} \in J$ extremes.

Equation 3.11 reveals that the main element in the $\underline{\beta}_{opt} \to \underline{\beta}_{rob}$ transformation is the parameter classification T, J, and $\overline{T \cup J}$. The following discussion develops this classification in two stages. The first stage explores LENS parameters and investigates the beamforming information contained in $\underline{\beta}$, while the second stage uses this information to derive the actual parameter classes. These two components are then combined into the final LENS robustness transformation, and some simple example situations are explored to demonstrate its operation.

3.3.1 LENS Parameter Classification, Part 1: Beamforming significance of $\underline{\beta}$ In order to classify a LENS parameter as either target-canceling or jammer-canceling, it is necessary to understand the significance of $\underline{\beta}$ as it relates to the overall system beamforming behavior. This relationship is stated as a fact for the two-element array of Section 3.1 [Equation 3.3], but it is more complex for general, M-element array architectures.

For general array architectures, $\underline{\beta}$ and $\underline{W}_{LENS,M}(\underline{\beta})$ are related by the fact that $\underline{\beta}$ describes a basis for the null-space, $[\underline{W}_{LENS,M}(\underline{\beta})]$, of $\underline{W}_{LENS,M}(\underline{\beta})$, which in turn describes the source-to-array transfer functions that are nulled by $\underline{W}_{LENS,M}(\underline{\beta})$. Given $\underline{\beta} = [\beta_1, \beta_2, \ldots, \beta_{M-1}]^T$, this basis consists of the vectors $$\underline{V}_i(\underline{\beta}) = \begin{bmatrix} 1 \\ \left(\frac{\beta_i + j}{\beta_i - j}\right) \\ \left(\frac{\beta_i + j}{\beta_i - j}\right)^2 \\ \vdots \\ \left(\frac{\beta_i + j}{\beta_i - j}\right)^{M-1} \end{bmatrix}, i = \{1, 2, \ldots, M-1\}. \quad (3.12)$$

To see why $\{\underline{V}_i(\underline{\beta})\}$ forms a basis for $[\underline{W}_{LENS,M}(\underline{\beta})]$, consider the following:

1. $[\underline{W}_{LENS,M}(\underline{\beta})]$ is an (M−1)-dimensional space: This arises from the fact that the null-space of a single M-element vector is always (M−1)-dimensional.

2. span$[\underline{V}_i(\underline{\beta})]$ is an (M−1)-dimensional space: Use the M−1 vectors $\underline{V}_i(\underline{\beta})$ and the vector $H_{target}$ to form the columns of and M-by-M Vandermonde matrix. Assuming that the $\beta_i$ are unique, then this Vandermonde matrix is non-singular, and its columns, including the $\underline{V}_i(\underline{\beta})$, are linearly-independent. These M−1, linearly-independent $\underline{V}_i(\underline{\beta})$ then span an M−1-dimensional space.

3. span$[\underline{V}_i(\underline{\beta})] \subseteq \mathcal{N}[\underline{W}_{LENS,M}(\underline{\beta})]$: It can be shown that each $\underline{V}_i(\underline{\beta})$ is an element of $\mathcal{N}[\underline{W}_{LENS,M}(\underline{\beta})]$. i.e., that $\underline{W}_{LENS,M}(\underline{\beta})^H \underline{V}_i(\underline{\beta})=0$. For this reason, any vector that may be expressed as the weighted sum of $\underline{V}_i(\underline{\beta})$—that is to say any vector within span $[\underline{V}_i(\underline{\beta})]$—is also within $\mathcal{N}[\underline{W}_{LENS,M}(\underline{\beta})]$.

The only way that one (M−1)-dimensional space may contain another (M−1)-dimensional space is if the two spaces are equal, and so these three properties reveal that span$[\underline{V}_i(\underline{\beta})]=\mathcal{N}[\underline{W}_{LENS,M}(\underline{\beta})]$. This is equivalent to stating that the vectors $\underline{V}_i(\underline{\beta})$ provide a basis for $\mathcal{N}[\underline{W}_{LENS,M}(\underline{\beta})]$.

This leads to the conclusion that the beamforming weight vector $\underline{W}_{LENS,M}(\underline{\beta})$ will null any source-to-array transfer function $\underline{H}(\theta, \Phi)$ for which there exists a set of complex coefficients, $\{c_i\}$, such that:

$$H(\theta, \phi) = \sum_{i=1}^{M-1} c_i \underline{V}_i(\underline{\beta}). \quad (3.13)$$

Since the target-to-array transfer function $\underline{H}_{target}\text{-}1$ is known, it is possible to use the $\underline{V}_i(\underline{\beta})$ to determine how 'close' $\underline{H}_{target}$ is to $\mathcal{N}[\underline{W}_{LENS,M}(\underline{\beta})]=\text{span}[\underline{V}_i(\underline{\beta})]$ and to define the desired LENS-classification regions T, J, and $\overline{T \cup J}$. Before prceeding with this process, however, it is interesting to consider the special case of ULA beamformer architectures with far-field sources, which display a convenient correspondence between the LENS parameters and the beamformers null locations Special Case: ULA Architectures Recall the ULA source-to-array transfer function for far-field sources $$\underline{H}_{ULA}(\theta, \phi) = \begin{bmatrix} 1 \\ e^{j\omega\tau(\theta,\phi)} \\ (e^{j\omega\tau(\theta,\phi)})^2 \\ \vdots \\ (e^{j\omega\tau(\theta,\phi)})^{M-1} \end{bmatrix} = \begin{bmatrix} 1 \\ H_1(\theta, \phi) \\ H_1(\theta, \phi)^2 \\ \vdots \\ H_1(\theta, \phi)^{M-1} \end{bmatrix}, \quad (3.14)$$

where $\tau(\theta, \Phi)$ is the additional temporal delay experienced by a source from $(\theta, \Phi)$ when traveling from array element i to array element (i+1). It turns out that, for this special type of source-to-array transfer function, $\underline{W}_{LENS,M}(\underline{\beta})$ nulls only source locations with $\underline{H}(\theta, \Phi)$ exactly equal to one of the basis vectors $\underline{V}_i(\underline{\beta})$:

$$\underline{H}_{ULA}(\theta, \Phi) \in \mathcal{N}[\underline{W}_{LENS,M}(\underline{\beta})] \Longleftrightarrow \underline{H}_{ULA}(\theta, \Phi)=\underline{V}_i(\underline{\beta}) \text{ for some } i \in \{1, 2, \ldots, M-1\}. \quad (3.15)$$

The $\Longleftarrow$ property of this relation is straightforward to see: since $\underline{V}_i(\underline{\beta})$ is a basis vector for $\mathcal{N}[\underline{W}_{LENS,M}(\underline{\beta})]$ then $\underline{H}_{ULA}(\theta, \Phi)=\underline{V}_i(\underline{\beta})$ is clearly within $\mathcal{N}[\underline{W}_{LENS,M}(\underline{\beta})]$. The $\Longrightarrow$ property is less obvious, however. Consider the M-by-M A matrix formed using the M−1 vectors $\underline{V}_i$ and the vector $\underline{H}_{ULA}(\theta, \Phi) \in \mathcal{N}[\underline{W}_{LENS,M}(\underline{\beta})]$:

$$A=[\underline{V}_1(\underline{\beta}) | \ldots | \underline{V}_{M-1}(\underline{\beta}) | \underline{H}_{ULA}(\theta, \Phi)].$$

Since $\{\underline{V}_i(\underline{\beta})\}$ forms a basis for $\mathcal{N}[\underline{W}_{LENS,M}(\underline{\beta})]$, then $\underline{H}_{ULA}(\theta, \Phi) \in \mathcal{N}[\underline{W}_{LENS,M}(\underline{\beta})]$ must be linearly dependent upon the $\underline{V}_i(\underline{\beta})$, which means that A is singular. Given the structure of $\underline{V}_i(\underline{\beta})$ [Equation 3.12] and $\underline{H}_{ULA}(\theta, \Phi)$ [Equation 3.14]), then A is a Vandermonde matrix, which is singular only if two of its columns are equal, Since the $\beta_i$ and $\underline{V}_i(\underline{\beta})$ are unique, then the Vandermonde A is signular only if $\underline{H}_{ULA}(\theta, \Phi)=\underline{V}_i(\underline{\beta})$ for some i, which proves $\Longrightarrow$.

By equating the elements of $\underline{V}_i(\underline{\beta})$ and $\underline{H}(\theta, \Phi)$, Equation 3.15 yields $$H_1(\theta, \phi) = e^{j\omega\tau(\theta,\phi)} = \frac{\beta_i + j}{\beta_i - j}, \quad (3.16)$$

for some $i = 1, 2, \ldots, M-1$, which may be re-written as:

$$\beta_i = \cot\left(\frac{\omega\tau(\theta, \phi)}{2}\right), \text{ for some } i = 1, 2, \ldots, M-1. \quad (3.17)$$

Solving this relationship for each $\beta_i$ reveals that $\underline{W}_{LENS,M}(\underline{\beta})$ nulls sources with locations that satisfy:

$$(\theta_i, \phi_i) = \tau^{-1}\left(\frac{2}{\omega}\cot^{-1}\beta_i\right), i = 1, 2, \ldots, M-1. \quad (3.18)$$

Note that these results match those stated in Equation 3.4 for two-element arrays Given that $\underline{\beta}_{opt}$ minimizes the expected beamformer output [Equation 3.8], then $\underline{W}_{LENS,M}(\underline{\beta}_{opt})$ should null the non-target sources in the array environment. This knowledge together with Equations 3.17 and 3.18 suggest that the $\underline{\beta}_{opt,i}$ are, in some sense, a set of non-target location estimates.

It should be noted that the special ULA relationship between the physical null location for $\underline{W}_{LENS,M}(\underline{\beta})$ and the LENS parameter set $\underline{\beta}$ holds for any array architecture that has a source-to-array transfer function of the form:

$$\underline{H}(\theta, \phi) = \begin{bmatrix} 1 \\ H_1(\theta, \phi) \\ H_1(\theta, \phi)^2 \\ \vdots \\ H_1(\theta, \phi)^{M-1} \end{bmatrix}.$$

Generally, only free-field ULSs will exhibit this form of source-to-array transfer function for all source locations. For other arrays, however, it is possible to pre-process the array input to yield source-to-array transfer function structures that are similar to the ULA structure for a subset of source locations that are of interest of the particular beamforming application.

In this case, $\underline{H}(\theta, \Phi) \in \mathcal{N}[\underline{W}_{LENS,M}(\underline{\beta})]$ when $$\underline{H}(\theta, \Phi)=\underline{V}_i(\underline{\beta}), i=\{1, 2, \ldots, M-1\},$$

which leads to nulls at locations that satisfy $$H_1(\theta, \phi) = \frac{\beta_i + j}{\beta_i - j} \Longrightarrow (\theta_i, \phi_i) = H_1^{-1}\left(\frac{\beta_i + j}{\beta_i - j}\right),$$

$i = \{1, 2, \ldots, M-1\}.$

Note that, by setting $H_1(\theta, \Phi)=\phi$, this results yields Equation 3.3 as stated for the two-element array in Section 3.1.

3.3.2 LENS Parameter Classification, Part 2: Generating Parameter Classes

Given the preceding relationship between $\underline{\beta}$ and $\underline{W}_{LENS,M}(\underline{\beta})$, it is now necessary to develop the classification procedure that labels LENS parameters as either T, J, or T∪J. This classification is achieved by measuring the impact of $\beta_i$ upon the 'closeness' of the assumed $\underline{H}_{target}$ to $_N[\underline{W}_{LENS,M}(\underline{\beta})]$: (1) if $\beta_i$ causes $_N[\underline{W}_{LENS,M}(\underline{\beta})]$ to be close to $\underline{H}_{target}$, then $\beta_i$ is considered to be target-canceling, i.e., $\beta_i \in T$, (2) if $\beta_i$ causes $_N[\underline{W}_{LENS,M}(\underline{\beta})]$ to be far from $\underline{H}_{target}$, then $\beta_i$ is considered to be jammer-canceling, i.e., $\beta_i \in J$, and (3) if $\beta_i$ causes $_N[\underline{W}_{LENS,M}(\underline{\beta})]$ to be an intermediate distance from $\underline{H}_{target}$, then $\beta_i$ has an intermediate effect, i.e., $\beta_i \in T \cup J$.

Distance Metric, $\Omega_i(\underline{\beta})$

Figure 6:
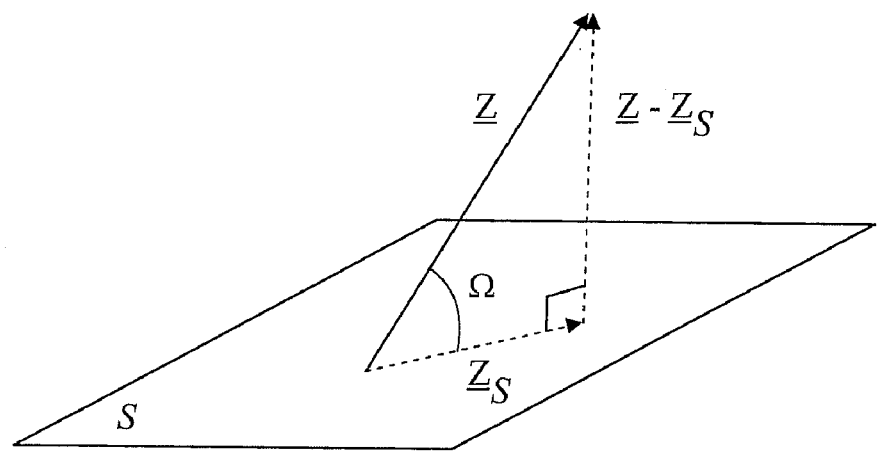
FIG. 6 is a pictorial illustration of the distance metric $\Omega$ between the vector $\underline{Z}$ and the subspace S.

One convenient distance measure between $_N[\underline{W}_{LENS,M}(\underline{\beta})]$ and $\underline{H}_{target}$ is the angle $\Omega(\underline{\beta})$ between the subspace and the vector. FIG. 6 shows the concept of $\Omega$ for a hypothetical subspace $\underline{S}$ and a vector $\underline{z}$, where $\underline{z}$ has been separated into two orthogonal components, $\underline{z}_s \in \underline{S}$ and $\underline{z} = \underline{z}_s|S$, that sum to form $\underline{z}$. When $\Omega=0$, then $\underline{z}_s = \underline{z}$, which means that $\underline{S}$ contains $\underline{z}$ entirely, and the distance is 0. On the other hand, when $\Omega=90°$, then $\underline{z}=0$, which means that $\underline{S}$ contains no information about $\underline{z}$ and the distance is maximal.

In practice, the dependence of $\Omega(\underline{\beta})$ upon $\underline{\beta}$ is complicated, and it is difficult to determine the impact of an individual $\beta_i$ upon this metric. It is possible, however, to define a set of metrics, $\{\Omega_i(\underline{\beta})\}$, where $\omega_i(\underline{\beta})$ is equal to the angle between $\underline{H}_{target}$ and the span of the single null-space basis vector $\underline{V}_i(\underline{\beta})$:

$$\Omega_i(\underline{\beta}) = \cos^{-1}\left(\frac{|\underline{V}_i(\underline{\beta})^H \underline{1}|}{\|\underline{V}_i(\underline{\beta})\|_2 \|H_{target}\|_2}\right) = \cos^{-1}\left(\frac{|\underline{V}_i(\underline{\beta})^H \underline{1}|}{\|\underline{V}_i(\underline{\beta})\|_2 \sqrt{M}}\right), \quad (3.19)$$

$$i = \{1, 2, \ldots, M-1\},$$

where $|\cdot|$ is the standard complex scalar magnitude, $\|\cdot\|_2$ is the Eculidean complex vector norm, and the second equality comes from the knowledge that $\underline{H}_{target} = \underline{1}$ and the $\|\underline{H}_{target}\|_2 = \sqrt{M}$. Although the set $\{\Omega_i(\underline{\beta})\}$ does not provide as accurate a distance measure between $N[\underline{W}_{LENS,M}(\underline{\beta})]$ and $\underline{H}_{target}$ as that provided by $\Omega(\underline{\beta})$, it does provide a general idea of this distance. Additionally, it has the advantage of being relatively simple and of measuring the effects of each LENS parameter $\beta_i$ individually. Note that, like $\Omega(\underline{\beta})$, $\Omega_i(\underline{\beta})$ ranges from a minimum-distance value of 0° to a maximum-distance value of 90°.

Ideal Parameter Classifications

Figure 7:
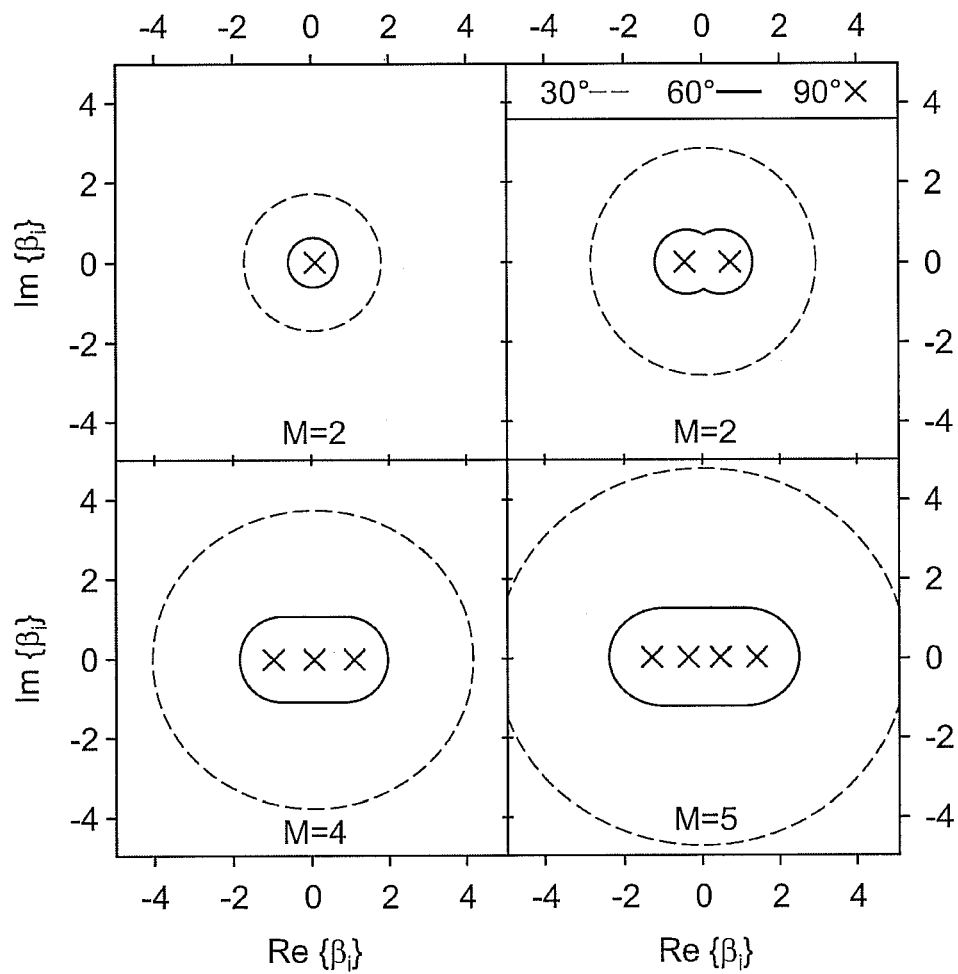
FIG. 7 is a plot of the contours of various values of $\Omega_i(\beta)$ for ULA arrays having 2, 3, 4 and 5 elements.

The metric $\Omega_i(\underline{\beta})$ serves as the vehicle through which $\underline{\beta}_{opt,i}$ is classified. FIG. 7 shows contour plots of $\Omega_i(\underline{\beta})$, as $\beta_i$ varies over the space of complex numbers, for cases of M=2, 3, 4, and 5 array elements. Specific contours indicating $\Omega_i(\underline{\beta})=30°, 60°, 90°$ are shown. Note the folling properties of the metric $\Omega_i(\underline{\beta})$ and the information that it contains about $\beta_i$:

1. $\Omega_i(\underline{\beta})$ achieves its maximum value of 90° at precisely M−1 points, known as the 'orthogonal' values of $\beta_i$: $\beta_k^I$, k={1, 2, ..., M−1}. At these values, the span of the individual $\underline{V}_i(\underline{\beta})$ is orthogonal to $\underline{H}_{target}$, and $\beta_i$ is considered at containing jammer-canceling information only.

2. $\Omega_i(\underline{\beta}) \to \infty$. At these values, span $[\underline{V}_i(\underline{\beta})]$ practically contains $\underline{H}_{target}$, and $\beta_i$ is considered as containing target-canceling information only.

3. $\Omega_i(\underline{\beta})$ decreases regularly as the distance between $\beta_i$ and the orthogonal values increases. At these intermediate values, $\beta_i$ contains both target-canceling and jammer-canceling information, with parameters near to $\beta_k^I$ being more jammer-canceling and parameters with large $|\beta_i|$ being more target-canceling.

These observations suggest the following classification of $\beta_i$:

$$\Omega_i(\underline{\beta}) \leq \Omega_T \Rightarrow \beta_i \in T,$$

$$\Omega_J \leq \Omega_i(\underline{\beta}) \Rightarrow \beta_i \in J,$$

$$\Omega_J < \Omega_i(\underline{\beta}) < \Omega_T \Rightarrow \beta_i \in T \cup J. \quad (3.20)$$

Figure 8:
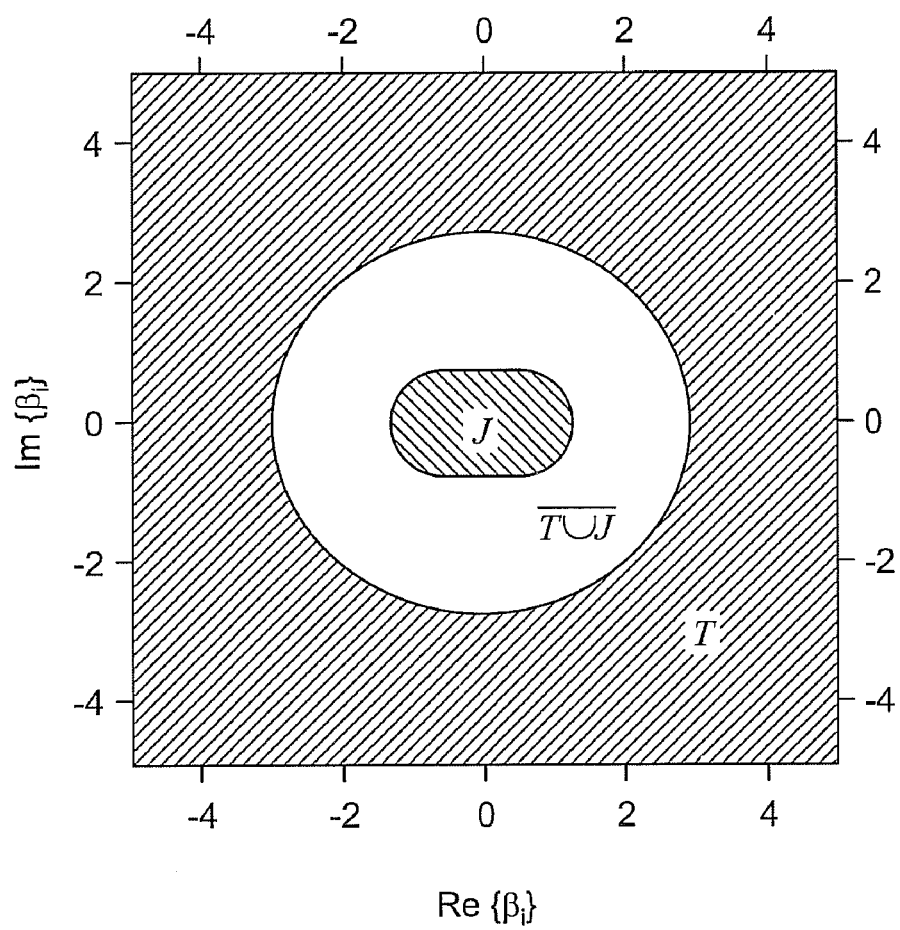
FIG. 8 is a plot that illustrates three LENS parameter classification regions for an array having three elements as described by Equation 3.20 with $\Omega_r=30°$ and $\Omega_r=60°$.

FIG. 8 indicates the three classification regions for an M=3 elements array when $\Omega_T=30°$ and $\Omega_J=60°$. Note that the specific values of $\Omega_T$ and $\Omega_J$ used in a specific LENS implementation will depend upon the array architecture and the frequency of the narrowband beamformer input. Boundary selection is discussed in more detail below for the case of ULSs.

A note on the 'orthogonal' values of $\beta_i$: It is possible to calculate explicitly the M−1 orthogonal values of $\beta_i$ that result in $\Omega(\beta_i)=90°$. Specifically, these are the $\beta_i$ that yield $\underline{V}_i(\underline{\beta})^H \underline{1} = 0$. Defining $$\alpha_i = \frac{\beta_i + j}{\beta_i - j}$$

and recalling the structure of $\underline{V}_i(\underline{\beta})$ [Equation 3.12], this requirement may be written as:

$$\underline{V}_i(\underline{\beta})^H \underline{1} = \sum_{l=0}^{M-1} \alpha_i^l = 0.$$

This polynominal in $\alpha_i$ is equal to 0 when:

$$\alpha_i = e^{j\frac{2\pi k}{M}}, \quad k = 1, 2, \ldots, M-1.$$

Solving $\alpha_i$ for $\beta_i$ yields the orthogonal values of $\beta_i$:

$$\beta_k^I = \cot\frac{\pi k}{M}, \quad k = 1, 2, \ldots, M-1. \quad (3.21)$$

An interesting side observation here is that the (M−1)-element LENS parameter vector that consists of these orthogonal values, $\underline{\beta}^I = [\beta_1^I, \beta_2^I, \ldots, \beta_{M-1}^I]^T$, yields a LENS weight vector that is equal to the uniform-weighting vector:

$$\underline{W}_{LENS,M}(\underline{\beta}^\perp) = \frac{1}{M}[1 \ 1 \ \cdots \ 1]^T = \frac{1}{M}\underline{1}.$$

This result reinforces the choice of $\Omega_i$ as the $\beta_i$ robustness metric, since the white-noise gain of $$\underline{W} = \frac{1}{M}\underline{1}$$

is $$G_w = \frac{1}{\underline{W}^H \underline{W}} = M$$

[Equation 2.15]. This is the maximum possible white-noise gain value for a weight vector that preserves $\underline{H}_{target}=\underline{1}$ with unit gain, which means that it achieves very robust beamforming.

Practical Parameter Classifications

In practice, the contours of constant $\Omega_i(\underline{\beta})$ are complicated and the preceding classification procedure can be difficult to implement. In order to yield a practical system, this research simplifies the problem by approximating the contours as boxes, centered at $\beta_i=0$. Empirical observations demonstrate that boxes with the following proportional relationship yield reasonable matches to the desired contours:

$$\frac{\text{Height}}{\text{Width}} = \frac{|Im\{\beta\}|}{|Re\{\beta\}|} = \frac{\Lambda(R)}{R} = \frac{\frac{(R+4\beta_1^\perp)(R-\beta_1^\perp)}{(R+3\beta_1^\perp)}}{R}, \quad (3.22)$$

where $$\beta_1^\perp = \cot\frac{\pi}{M}$$

is the largets orthogonal $\beta_i$ value, as defined in Equation 3.21, and where the box half-width R lies between $\beta_1^{\perp l}$ and $\infty$. Based on $\Lambda(R)$, the rectangular approximation becomes square as $R \to \infty$ and a flat line extending from real values $-\beta^{\perp\perp}=\beta_{m-1}^\perp$ to $\beta_1^\perp$ as $R \to \beta_1^\perp$. This reflects the behavior of the true contours of $\Omega_i$, which becomes circular as $\Omega_i \to 0°$ and which converge to the M−1 points $\beta_K^\perp$, K={1, 2, ..., M−1}, as $\Omega_i \to 90°$.

Figure 9:
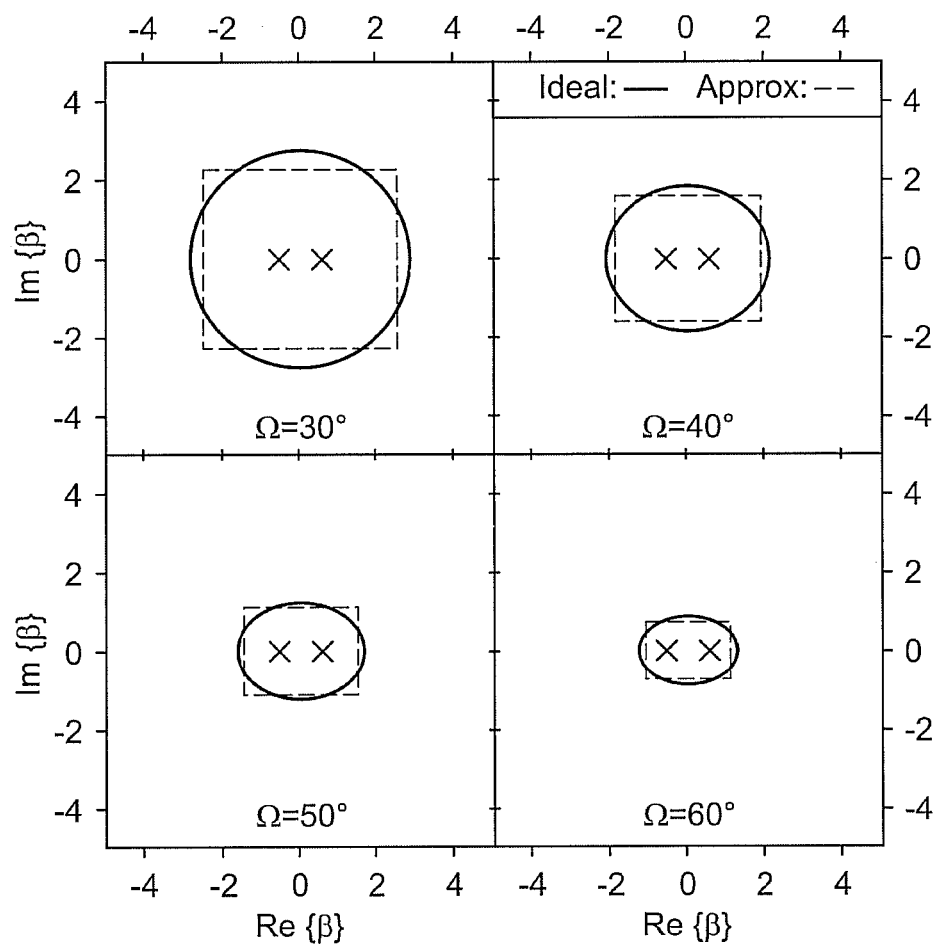
FIG. 9 is a plot of the contours for a three element array and $\Omega(\beta_i)=30°$, 40°, 50° and 60° and $\beta_i$ indicated as (x)

FIG. 9 demonstrates the relationship between the real and approximated contours of constant $\Omega(\beta_i)$ for an M=3 element array. As shown, the boxes yield reasonably good apporximations to the actual contour curves, especially as $\Omega_i$ approaches 90°. Similar results are obtained for other values M.

Figure 10:
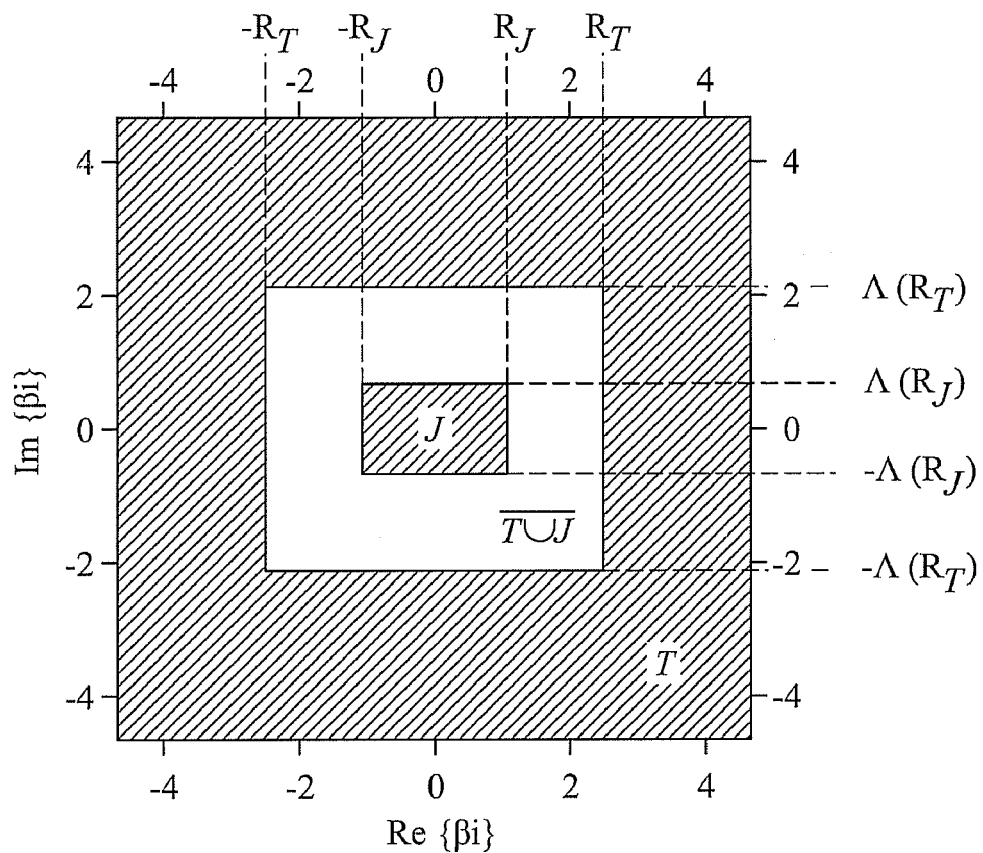
FIG. 10 is a plot that illustrates three LENS parameter classification regions for a three element array according to Equation 3.23 when $R_r$ and $R_j$ are chosen to reflect the $R_T=30°$ and $R_j=60°$ contours, respectively.

Given the box-approximation to the contours of constant $\Omega_i$, the LENS parameter classification from Equation 3.20 may be re-expressed as:

$$|Re\{\beta_i\}| \geq R_T \text{ OR } |Im\{\beta_i\}| \geq \Lambda(R_T) \Longrightarrow \beta_i \in T, \quad (3.23)$$
$$|Re\{\beta_i\}| \leq R_J \text{ AND } |Im\{\beta_i\}| \leq \Lambda(R_J) \Longrightarrow \beta_i \in J,$$
$$\left\{\begin{array}{c} |Re\{\beta_i\}| > R_J \text{ OR } |Im\{\beta_i\}| > \Lambda(R_J) \\ \text{AND} \\ |Re\{\beta_i\}| < R_T \text{ AND } |Im\{\beta_i\}| < \Lambda(R_T) \end{array}\right\} \Longrightarrow \beta_i \in \overline{T \cup J},$$

which is shown graphically in FIG. 10. The values of $R_T$ and $R_J$ yield classification boundaries that are close to those obtained using ideal contours at $\Omega_T$ and $\Omega_J$ in FIG. 8. By definition, T and J should be non-overlapping, which is satisifed if $R_T > R_J$. In this case, the boundary-selection process becomes that of choosing $R_T$ and $R_J$ rather than that of choosing $\Omega_T$ and $\Omega_J$. These choice are explored in more detail below for ULSs.

Special Case: Broadside ULA Architectures

This section explores the process for determining the specific values of $R_T$ and $R_J$ for the special case of broadside ULA systems.

Section 3.3.1 demonstrates that, for ULAs, there is a correspondence between the LENS parameters $\beta_i$ and the beam-pattern null locations. Specifically, the parameter $\beta_i$ produces a null at the location $(\theta_i, \Phi_i)$ that satifies $$\beta_i = \cot\left(\frac{\omega\tau(\theta_i, \phi_i)}{2}\right), \quad (3.24)$$

where $T(\theta, \Phi)$ is the inter-element delay experience by a source from the $(\theta, \Phi)$ location. Equation 2.7 may be used to show that ULAs that are oriented to the target signal have inter-element delays with the structure $$\tau(\theta, \phi) = \frac{d}{c}\sin\theta, \quad (3.25)$$

where $\theta$ is the angle between the source propagation direction and the plane perpendicular to the array axis [Section 2-2]. Note that $T(\theta, \Phi)$ depends on $\theta$ only and not on $\Phi$, due to the cylindrically-symmetric array behavior about the array axis.

Equations 3.24 and 3.25 provide a convenient means for determining the target-canceling and jammer-canceling region boundaries that are used in the LENS classification procedure above. Specifically, a $\beta_i$ that produces a null within an angle $\theta_T$ of the target location is labeled target-canceling, while a $\beta_i$ that produces a null at an angle greater than $\theta_J$ from the target location is labeled jammer-canceling. Given that the target location is $\theta_T=0$, these requirements may be expressed as:

Target-Canceling: $|\theta_i - \theta_T| < \theta_T \iff |\beta_i| > \cot\left(\frac{\omega d}{2c}\sin\theta_T\right)$, Jammer-Canceling: $|\theta_i - \theta_T| < \theta_J \iff |\beta_i| < \cot\left(\frac{\omega d}{2c}\sin\theta_J\right)$.

By comparing this classification to that proposed in Equation 3.23 and by noting that $\beta_i$ are assumed to be real for Equation 3.24, then this argument suggests that the desired robustness regions could be achieved using:

$$R_T = \cot\left(\frac{\omega d}{2c}\sin\theta_T\right) \quad (3.26)$$

$$R_J = \cot\left(\frac{\omega d}{2c}\sin\theta_J\right).$$

As long as $\theta_T < \theta_J$, these values will yield three distinct LENS classification regions as shown in FIG. 10 and described in Equation 3.23. This research uses these formulae for $R_T$ and $R_J$, with $\theta_T = 15°$ and $\theta_J = 30°$.

In practice, both upper and lower limits are imposed upon $R_T$ and $R_J$. the upper limit restricts any unusually large $\beta_i$ values, which prevents very large values of the weight vector norm, $\underline{W}_{LENS,M}(\underline{\beta})^H \underline{W}_{LENS,M}(\underline{\beta})$ and prevents excessively small values of the system white noise gain $$G_\omega = \frac{1}{\underline{W}_{LENS,M}(\underline{\beta})^H \underline{W}_{LENS,M}(\underline{\beta})}. \quad \text{[Equation 2.15]}$$

It must be noted that the precise relationship between $\underline{\beta}$ and the weigth vector norm is complex, and so the upper bounds on $R_T$ and $R_J$ are not designed to restrict $\underline{W}_{LENS,M}(\underline{\beta})^H \underline{W}_{LENS,M}(\underline{\beta})$ to be below a specifc value. This research uses $R_T < 30$ and $R_J < 10$, which have been determined empirically to yield good performance.

The lower limit on $R_T$ and $R_J$ ensures that the LENS parameters always has a minimal amount of 'maneuvering room' about the orthogonal parameter values $$\beta\frac{1}{k} = \cot\frac{k\pi}{M},$$

$k = \{1, 2, \ldots, M-1\}$. The precise impact of these lower bounds is difficult to derive, and this research uses $R_T > \beta_1^\perp 2$ and $R_J > \beta_1^\perp + 1$, which have been determined empirically to yield good performance.

Together, the upper and lower bounds on $R_T$ and $R_J$ for this research are:

$\beta_1^\perp + 2 < R_T < 30$ $\beta_1^\perp + 1 < R_J < 10.$ (3.27)

3.3.3 Final Transformation: $\underline{\beta}_{opt} \to \underline{\beta}_{rob}$ Given the LENS classification procedure above, it is possible to state the actual $\underline{\beta}_{opt} \to \underline{\beta}_{rob}$ transformation, based on Equation 3.11:

$$\beta_{rob,i} = \begin{cases} 0 & \beta_{opt,i} \in T \\ \beta_{opt,i} & \beta_{opt,i} \in J \\ F[\beta_{opt,i}] & \beta_{opt,i} \in \overline{TUJ} \end{cases} \quad (3.28)$$

The first two components of this transformation are straightforward given the classes T and J. For the third component, recall that $F[\beta_{opt,i}]$ should be a smooth transition between the $\beta_{opt,i} \in T$ and $\beta_{opt,i} \in J$ extremes. For the box classifications of Equation 3.23 [FIGS. 3-7], one possible $F[\beta_{opt,i}]$ is:

$$F[\beta_{opt,i}] = \underbrace{\min\left[\frac{|Re\beta_{opt,i}| - R_T}{R_T - R_J}, \frac{|Im\beta_{opt,i}| - \Lambda(R_J)}{\Lambda(R_T) - \Lambda(R_J)}\right]}_{f[\beta_{opt,i}]} \beta_{opt,i}, \quad (3.29)$$

where $f[\beta_{opt,i}] = 1$ for $\beta_{opt,i}$ on the border of the T, $f[\beta_{opt,i}] = 0$ for $\beta_{opt,i}$ on the border of the T, and $f[\beta_{opt,i}]$ linearly moves from 1 to 0 as either $Re[\beta_{opt,i}]$ progresses from $R_J$ to $R_T$ or $IM[\beta_{opt,i}]$ progresses from $\Lambda(R_J)$ to $\Lambda(R_T)$. Given this $F[\beta_{opt,i}]$, Equation 3.28 may also be expressed as $\beta_{rob,i} = \overline{f}[\beta_{opt,i}]\beta_{opt,i}$, where $$\overline{f}[\beta_{opt,i}] = \begin{cases} 0 & \beta_{opt,i} \in T \\ 1 & \beta_{opt,i} \in J \\ f[\beta_{opt,i}] & \beta_{opt,i} \in \overline{TUJ} \end{cases}. \quad (3.30)$$

3.3.4 Example Cases

In order to gain some understanding into how the LENS robustness restriction actually operates, this section, presents some simple examples based upon a two-element array with an element spacing of d=0.07 m. This arry is oriented broadside to the target location, which means that no steering delays are needed to make $\underline{H}_{target} = \underline{1}$. Assuming far-field sources, then Equations 2.6 and 2.7 may be combined to yield the source-to-array transfer function expression:

$$H(\theta, \phi) = \begin{bmatrix} 1 \\ e^{j\omega\frac{d}{c}\sin\theta} \end{bmatrix} = \begin{bmatrix} 1 \\ e^{j2\pi f\frac{0.07\text{ m}}{345\text{ m/sec}}\sin\theta} \end{bmatrix},$$

where an acoustic propagation velocity of c=345 m/sec has been used and where $\theta$ is the angle between the source propagation direction and the plane that is perpendicular to the array axis [Section 2.2.1]. In the azimuth plane, $\theta$ may be interpreted as the angle of the left of the assumed target location.

Given this array, consider the following four source situations, where a single source, with source-to-array transfer function $\underline{H}^k$, dominates $\beta^k_{opt,1}$. The values of $\beta^k_{opt,1}$ that yield $\underline{W}_{LENS,M}(\beta^k_{opt,1})^H \underline{H}^k = 0$ are also given, as determined from Equation 3.3. Note that a perfectly-aligned target source, with $\underline{H}(\theta, \Phi) = \underline{H}_{target}$, is not considered, since, by definition, $\underline{W}_{LENS,2}(\beta_1)$ cannot null this location.

1. f=500 Hz, 10° mis-aligned target, matched array elements:

$$H^1 = \begin{bmatrix} 1 \\ e^{j2\pi 500 \text{ Hz} \frac{0.07 \text{ m}}{345 \text{ m/sec}} \sin 10°} \end{bmatrix} \Leftrightarrow \beta^1_{opt,1} = 18.01.$$

2. f=500 Hz, aligned target, mis-matched array elements:

$$H^2 = \begin{bmatrix} 1 \\ 0.9 \end{bmatrix} \Leftrightarrow \beta^2_{opt,1} = -j19.0.$$

3. f=500 Hz, 45° jammer, matched array elements:

$$H^3 = \begin{bmatrix} 1 \\ e^{j2\pi 500 \text{ Hz} \frac{0.07 \text{ m}}{345 \text{ m/sec}} \sin 45°} \end{bmatrix} \Leftrightarrow \beta^3_{opt,1} = 4.36.$$

4. f=500 Hz, 45° jammer, mis-matched array elements:

$$H^4 = \begin{bmatrix} 1 \\ 0.9 e^{j2\pi 500 \text{ Hz} \frac{0.07 \text{ m}}{345 \text{ m/sec}} \sin 45°} \end{bmatrix} \Leftrightarrow \beta^4_{opt,1} = 4.13 - j1.0.$$

Figure 11:
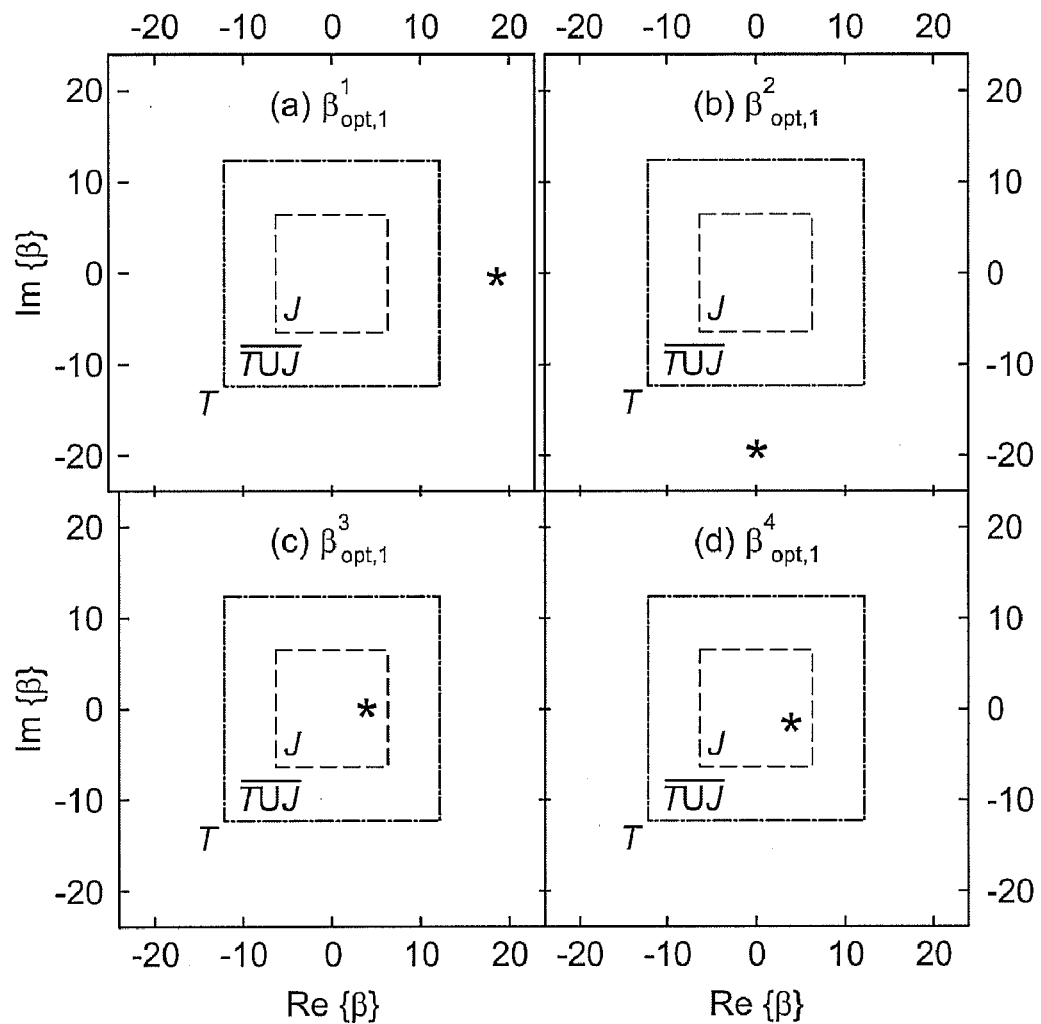
FIG. 11 is a plot of illustrating four examples of $\beta_{opt,j}$ for a two-element array along with the corresponding LENS robustness regions.

FIG. 11 plots these four $\beta^k_{opt,1}$ values as well as the LENS robustness regions for f=500 Hz, defined according to the $R_T$ and $R_J$ of Equation 3.26 with $\theta_T$=15° and $\theta_J$=30°.

Figure 12:
FIG. 12 is a flow chart illustration of processing steps according to the present invention.

These plots demonstrate the LENS robustness restriction at work. The target-canceling LENS parameters, $\beta^1_{opt,1}$ and $\beta^2_{opt,1}$, lie in the T region, which means that the robustness restriction transforms them to the neutral value of $\beta^1_{rob,1}=\beta^2_{rob,1}=0$. On the other hand, the jammer-canceling LENS parameters, $\beta^3_{opt,1}$ and $\beta^4_{opt,1}$, lie within The Overall LENS Algorithm FIG. 12 summaries the overall LENS algorithm. Since this research will study ULAs that have been oriented broadside to the target location, the robustness transformation boundaries derived in Section 3.3.2 will be used:

$$R_T = \cot\left(\frac{\omega d}{2c} \sin 15°\right), \quad \beta \frac{1}{1} + 2 < R_T < 30, \quad (3.31)$$
$$R_J = \cot\left(\frac{\omega d}{2c} \sin 30°\right), \quad \beta \frac{1}{1} + 1 < R_J < 10,$$

subject to where d is the inter-element array spacing, c is the propagation velocity, and $\beta_1^\perp$ is the largets mangitude orthogonal value [Equation 3.21].

One LENS feature is immediately obvious when comparing LENS to traditional CMV processing from Section 2.3.2: LENS separates the robustness constraining process from the beamforming power minimization, while CMV combines the robustness constraints into the beamforming power minimization. It is the separation of these two components that allows LENS processing to exhibit direct and flexible control over the beamforming.

5 Modified LENS: Skew LENS Processing

Skew LENS processing is a relatively simple modification of standard LENS processing. Specifically, it consists of the following four steps:
1. Given the standard LENS input, which has been steered to have $\underline{H}_{target}$–1, form the skewed input signal $\underline{X}=Z\underline{X}$, where:

$$Z = \begin{bmatrix} 1 & 0 & \cdots & 0 \\ 0 & \zeta & & \vdots \\ \vdots & & \ddots & 0 \\ 0 & \cdots & 0 & \zeta^{M-1} \end{bmatrix}. \quad (5.1)$$

The matrix Z is the skewing matrix and $\zeta$ is the skewing parameter.
2. Generate the optimal skewed LENS parameter set $\underline{\beta}_{\zeta,opt}$ based on $\underline{X}_\zeta$, i.e., use the standard LENS definition [Equation 3.8], with $R_{x_\zeta x_\zeta}$ rather than $R_{XX}$.
3. Restrict $\underline{\beta}_{\zeta,opt}$ for robustness to form $\underline{\beta}_{\zeta,rob}$.
4. Form the weight vector $\underline{W}_{LENS,M}(\underline{\beta}_{\zeta,rob})$ and use this to form the beamformer output $Y=\underline{W}_{LENS,M}(\underline{\beta}_{\zeta,rob})^H \underline{X}_\zeta$.

Given this description, it is clear that Skew LENS reduces to standard LENS processing when $\zeta=1$ and Z becomes the identity matrix It is very important to note that the optimal Skew LENS parameter set, $\underline{\beta}_{\zeta,opt}$, is defined using the standard LENS definition [Equation 3.8] applied to $\underline{X}_\zeta$, i.e., $\underline{\beta}_{\zeta,opt}$ is designed to preserve sources with $\underline{H}(\theta, \Phi)$=1. Given the Skew LENS definition, however, it is clear that the assumed target location now has a transfer function of $$H_{\zeta,target} = Z\underline{1} = \begin{bmatrix} 1 \\ \zeta \\ \vdots \\ \zeta^{M-1} \end{bmatrix}, \quad (5.2)$$

which means that $\underline{\beta}_{\zeta,opt}$ may actually cancel the assumed target location! As described below, however, the introduction of this controlled and very structured error into $\underline{H}_{target}$ concentrates target-canceling beamforming information into a single LENS parameter, which can improve the overall LENS performance.

The following sections present the logic behind Skew LENS processing, discuss the selection of the skewing parameter $\zeta$, develop a modified LENS robustness restriction for Skew LENS processing, and present complete Skew LENS description.

5.1 Skew LENS Basics

For the special case of idealized narrowband far-field sources with a mis-aligned target, LENS algorithm can completely separate the target-canceling and jammer-canceling beamforming effects within the optimal LENS parameter set. This allows LENS to prevent target cancellation without limiting jammer cancellation, which results in array gain levels that are nearly-equal to those observed with a perfectly-aligned target.

For all other array environments, LENS cannot completely separate target-canceling from jammer-canceling information in the optimal LENS parameter set. This means that LENS cannot restrict target cancellation without simultaneously limiting jammer cancellation, which prevents LENS from maintaining near-ideal performance levels. Skew LENS processing is an attempt to increase the separation of target-canceling and jammer-canceling information in the optimal LENS parameter set for all array environments and for all sources of target-cancellation.

Skew LENS processing achieves this goal through the skewing matrix Z. Specifically, Z concentrates the possible target-canceling LENS parameter values into a relatively small subset of the overall LENS parameter space. By concentrating the range of possible target-canceling LENS parameter values, Skew LENS processing allows these values to be covered by a single LENS parameter. This frees the remaining parameters for jammer cancellation and increases the separation of target-canceling and jammer-canceling information within $\underline{\beta}_{\zeta, opt}$.

To see how Z concentrates target-canceling LENS parameters, recall the behavior of these parameters. Section 3.3.1 shows the $\underline{\beta}$ describes a basis, $\{\underline{V}_i(\underline{\beta})\}$, for the null-space N[$\underline{W}_{LENS,M}(\underline{\beta})$], of $\underline{W}_{LENS,M}(\underline{\beta})$, where $$\underline{V}_i(\underline{\beta}) = \begin{bmatrix} 1 \\ \left(\frac{\beta_i+j}{\beta_i-j}\right) \\ \left(\frac{\beta_i+j}{\beta_i-j}\right)^2 \\ \vdots \\ \left(\frac{\beta_i+j}{\beta_i-j}\right)^{M-1} \end{bmatrix}, i = \{1, 2, \ldots, M-1\}.$$

A target-canceling LENS parameter, $\beta_i$, corresponds to a $\underline{V}_i(\underline{\beta})$ that is close to the $\underline{H}_{target}$. Apply this observation to standard and Skew LENS processing:

1. For standard LENS, [$\underline{H}_{target}$=1], this closeness occurs when $$|\beta_i| \to \infty.$$

2. For Skew LENS, [$\underline{H}_{\zeta,target}$=Z1] this closeness occurs when $$\zeta = \frac{\beta_i+j}{\beta_i-j} \Rightarrow \beta_i = j\frac{\zeta+1}{\zeta-1},$$

assuming $\zeta \neq 1$.

Now, assume that the actual target-to-array transfer function, $\hat{\underline{H}}_{target}$, is near to, but not equal to, $\underline{H}_{target}$=1. For standard LENS, as $\hat{\underline{H}}_{target}$ varies from $\underline{H}_{target}$, it is clear that that the target-canceling LENS parameters will cover the entire large-$|\beta_i|$ region. For Skew LENS, on the other hand, as $\hat{\underline{H}}_{\zeta,target}$=Z$\hat{\underline{H}}_{target}$ varies from $\underline{H}_{\zeta, target}$, it is clear that the target-canceling LENS parameters will be clustered about $$\beta_i = j\frac{\zeta+1}{\zeta-1}.$$

This demonstrates that, as desired, Skew LENS concentrates the target-canceling LENS parameters.

5.2 Selecting the Skew Parameter, $\zeta$

The Skew LENS parameter, $\zeta$, determines the amount of concentration that Z introduces into the target-canceling LENS-parameter values and the overall ability of Skew LENS to separate target-canceling from jammer-canceling information. In general, as $\zeta$ deviates further from the non-skewed case of $\zeta$=1, more skewing and more concentration occur. Care must be taken, however, when selecting $\zeta$, and the following rules should be observed:

1. $\zeta$ shold not yield Z$\underline{H}(\theta, \Phi)$=1 for any non-target ($\theta, \Phi$):

Since that $\underline{B}_{\zeta, opt}$ is defined using the standard LENS optimization, it preserves sources with source-to-array transfer functions of Z $\underline{H}(\theta, \Phi)$=1. Given the beamforming goal of jammer signal attenuation, it is clearly undesirable for Z to map a jammer source to have Z $\underline{H}(\theta, \Phi)$=1.

Consider as an example broadside ULAs. As shown in Equation 2.6, these arrays have non-skewed source-to-array transfer functions of the form:

$$\underline{H}(\theta, \phi) = \begin{bmatrix} 1 \\ e^{j\omega T_1(\theta,\phi)} \\ \vdots \\ e^{j\omega(M-1)T_1(\theta,\phi)} \end{bmatrix},$$

where $$\tau(\theta, \phi) = \frac{d}{c}\sin\theta,$$

d is the inter-element spacing and c i the propagation velocity. Given this $\underline{H}(\theta, \Phi)$, a skewing factor of $\zeta = e^{-j\omega\tau(\theta_1,\Phi_1)}$ would yield Z $\underline{H}((\theta_1, \Phi_1)$=1, and that Skew LENS would preserve sources from the $(\theta_1, \Phi_1)$ location! For ULAs, Z $\underline{H}(\theta, \Phi)$=1 is avoided when $|\zeta| \neq 1$.

2. $\zeta$ should not skew the processing excessively far from standard LENS processing, i.e., $|\zeta-1|$ should not be too large:

As $\zeta$ deviates further from the non-skewed $\zeta$=1, the concentration of the target-canceling LENS parameter values increases. Unfortunately, if $\zeta$ deviates too far, then the skewing also begins to concentrate the jammer-canceling information into the same set of LENS parameter values. This reduces the separation of the target-canceling and jammer-canceling information.

Consider as an example the broadside ULA situation from above, which has the non-skewed source-to-array transfer functions given above. At low frequencies, the dealy term $\tau(\theta, \Phi)$ is small for both target and jammer locations, which means that $\underline{H}(\theta, \Phi)$ is always 'near' to $\underline{H}_{target}$=1. A skewing parameter that deviates largely from $\zeta$=1 masks entirely the $e^{j\omega\tau(\theta,\Phi)}$ term in Z $\underline{H}(\theta, \Phi)$, which means that the jammer-canceling LENS parameter values for this location are concentrated together with the target-canceling LENS parameter values. Empirical observations conducted for this research suggest that $|\zeta-15| < 0.05$ avoids excessive concentration of jammer-canceling LENS parameter values.

For this research, Skew LENS is implemented with $\zeta$=0.95.

5.3 Skew LENS Robustness Restriction

As described above, Skew LENS processing applies the skewing matrix Z to the standard LENS beamformer input, $\underline{X}$, in order to concentrate the possible target-canceling LENS parameter values into a relatively small subset of the LENS parameter space. Since this transformation re-maps the target-canceling and jammer-canceling LENS parameter regions, it is necessary to re-define the LENS robustness regions T, J, and $\overline{TUJ}$ (target-canceling, jammer-canceling, and intermediate, respectively) that are used in the LENS robustness restriction of Section 3.3.

Such a re-definition would be a time-consuming and rather difficult procedure, but, fortunately, there is a relatively simple means of by-passing this problem. It is possible to convert $\beta_{\zeta,opt}$ into the non-skewed LENS parameter set $\beta_{ns,opt}$, for which the target-canceling and jammer-canceling LENS parameter regions are mapped back to their original, non-skewed, standard-LENS locations. This $\beta_{ns,opt}$ may then be restricted for robustness using the standard LENS procedure of Section 3.3 to yield $\beta_{ns,rob}$, and this result may be 're-skewed' to for $\beta_{\zeta,rob}$.

At first glance, it may appear that this non-skewing transformation negates all of the beneficial effects of Skew LENS processing and that $\beta_{ns,opt}$ may simply equal the original, standard LENS parameter $\beta_{opt}$. This behavior is not, in fact, true—all beneficial effects of Skew LENS processing arise o ut of the actual power minimization that yields $\beta_{\zeta,opt}$, and the non-skewing transformation is simply a tool that assists in the robustness restriction to form $\beta_{\zeta,rob}$.

5.3.1 Relationship between $\beta_\zeta$ and the Non-Skewed $\beta_{ns}$

A Skew LENS parameter set $\beta_\zeta$ and its non-skewed counterpart $\beta_{ns}$ are considered equivalent if they describe the same beamforming behavior. Specifically, these two parameter sets will be considered equivalent when the beamforming accomplished by $$\underline{W}_{LENS,M}(\beta_\zeta)^H \underline{X}_\zeta = \underline{W}_{LENS,M}(\beta_\zeta)^H Z\underline{X}$$

is equivalent to the beamforming accomplished by $$\underline{W}_{LENS,M}(\beta_{ns})\underline{X},$$

where Z is the skewing matrix of Equation 5.1 and the relation $\underline{X}_\zeta = Z\underline{X}$ has been used. Such beamforming equivalence is attained when $$N[Z^H \underline{W}_{LENS,M}(\beta_\zeta)] = N[\underline{W}_{LENS,M}(\beta_{ns})] \quad (5.3)$$

Equation 5.3 is true when $\beta_\zeta$ and $\beta_{ns}$ are related using the following transformation pair:

$$\text{Skewed} \Rightarrow \text{Non-Skewed} \quad \beta_{ns,i} = j\frac{(\beta_{\zeta,i}+j) + \zeta(\beta_{\zeta,i}+j)}{(\beta_{\zeta,i}+j) - \zeta(\beta_{\zeta,i}+j)} \quad (5.4)$$

$$\text{Non-Skewed} \Rightarrow \text{Skewed} \quad \beta_{\zeta,i} = j\frac{\zeta(\beta_{ns,i}+j) + (\beta_{ns,i}+j)}{\zeta(\beta_{ns,i}+j) - (\beta_{ns,i}+j)}$$

5.3.2 Skew LENS Robustness Restriction Summary

FIG. 13 presents the overall robustness, restriction process for Skew LENS processing. It consists of the standard LENS robustness restriction nested between the $\beta_{\zeta,opt} \rightarrow \beta_{ns,opt}$ and $\beta_{ns,rob} \rightarrow \beta_{\zeta,rob}$ transformations.

5.4 Overall Skew LENS Algorithm

Figure 14:
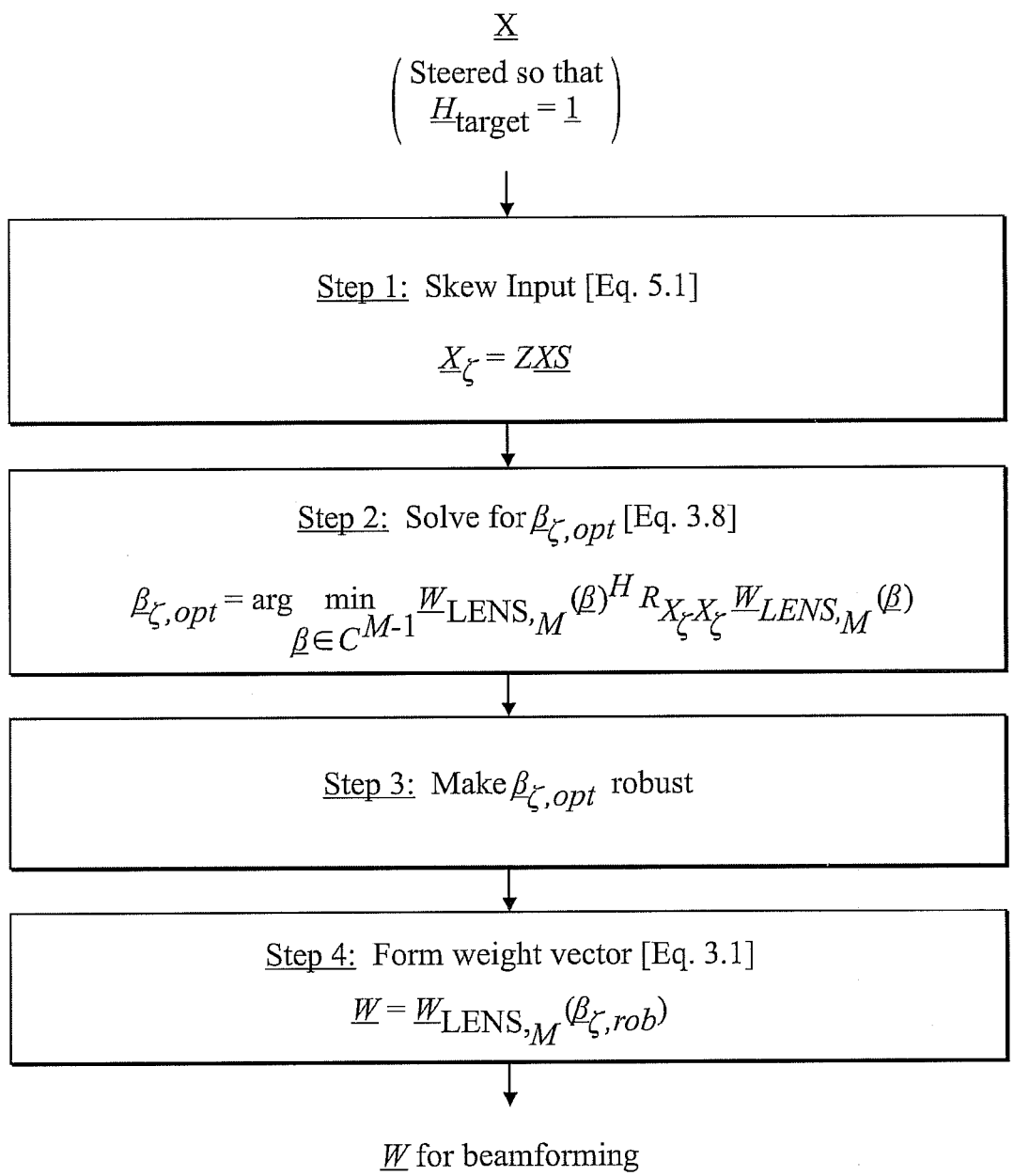
FIG. 14 is a flow chart illustration of yet another series of alternative embodimnet processing steps according to the present invention.

FIG. 14 shows the overall SKew LENS flow diagram. This resembles the standard LENS flow diagram from Section 3.4, but it adds the input-skewing step as Step 1 and modifies the LENS robustness restriction as described by FIG. 13.

6 LENS Implementation

The main computational component of either standard LENS [section 3] or Skew LENS [section 5] processing is the determination of the optimal LENS parameter set, $\beta_{opt}$ or $\beta_{\zeta,opt}$. Once this optimal parameter set has been determined, it is a straight-forward process to restrict the parameters for robustness and to generate the final beamforming weight vector. This chapter develops and simulates two implementation methods that use the temporal stream of narrowband array input observations, $\{\underline{X}^{(l)}\}$ to form a running estimate $\beta_{opt}^{(l)}$ of the optimal LENS parameter set. Note that, although this chapter uses the terminology of standard LENS processing, the identical methods may be used to obtain $\beta_{\zeta,opt}^{(l)}$ from $\{\underline{X}_\zeta^{(l)}\}$ for Skew LENS processing.

Recall from section 3 that the optimal LENS parameter set is defined as the parameter set that minimizes the expected beamformer output power that arises when using the LENS weight vector $\underline{W}_{LENS,M}(\beta)$:

$$\beta_{opt} = \arg\min_{\beta \in C^{M-1}} \underbrace{\underline{W}_{LENS,M}(\beta)^H R_{XX} \underline{W}_{LENS,M}(\beta)}_{\overset{def}{=} P[\beta]}, \quad (6.1)$$

where $R_{XX} = E[\underline{X}\underline{X}^H]$ is the input covariance matrix and $P[\beta]$ is defined to be the expected beamformer output power. As shown in Section 3.2.1 [Equation 3.10], the closed-form solution to this optimization may be written as:

$$\beta_{opt} = -\text{roots}\left(\frac{1^H R_{XX}^{-1} Q_M^H}{1^H R_{XX}^{-1} 1}\right), \quad (6.2)$$

where the operation roots($\underline{p}$) returns the set of roots for the polynominal with coefficients given by the elements of the vector $\underline{p}$.

Since $R_{XX}$ is unknown and time-varying, Equation 6.2 generally cannot be used to generate a single $\beta_{opt}$ that describes the entire input. Instead, $\beta_{opt}$ must be estimated actively from the temporal stream of input observations, $\{\underline{X}^{(l)}\}$. The most obvious LENS implementation would use $\{\underline{X}^{(l)}\}$ to formulate a time-dependent input covariance estimate $\hat{R}^{(l)}_{XX}$, which, through Equation 6.2, would yield a time-dependent optimal parameter set $\beta^{(l)}_{opt}$. Unfortunately, the matrix inversion and polynomial root calculation render this system computationally expensive in practice. This chapter develops two alternate, iterative solutions to the LENS optimization of Equation 6.1 and uses these solutions to develop actual LENS implementations.

Relaxation Approximations

This class of adaptive solution arises out of the Gauss-Seidel relaxation-iteration for linear systems of equations and solves Equation 6.1 by cycling through the LENS parameters and minimizing P[$\beta$] with respect to each $\beta_i$ individually while holding the remaining $\beta_m$, m≠i, fixed to their most recent values.

Gradient Approximations

This class of adaptive solution calculates the gradient of P[β] with respect to the individual $\beta_i$ parameters and follows the gradient to minimize P[β].

6.1 Useful Formulae $$\frac{\partial P[\beta]}{\partial \beta_{R,i}}, \frac{\partial P[\beta]}{\partial \beta_{I,i}}, \frac{\partial^2 P[\beta]}{\partial \beta_{R,i}^2}, \text{ and } \frac{\partial^2 P[\beta]}{\partial \beta_{I,i}^2}.$$

Before developing the Relaxation and Gradient LENS implementations, this section presents expressions for the partial derivatives $$\frac{\partial P[\beta]}{\partial \beta_{R,i}}, \frac{\partial P[\beta]}{\partial \beta_{I,i}}, \frac{\partial^2 P[\beta]}{\partial \beta_{R,i}^2}, \text{ and } \frac{\partial^2 P[\beta]}{\partial \beta_{I,i}^2},$$

where $\beta_i = \beta_{R,i} + j\beta_{I,i}$. These partial derivatives are required for the development of both iterative LENS solutions.

Given $$\frac{\partial P[\beta]}{\partial \beta_{R,i}} = 2B_{R,i} + 2\beta_{R,i} C_i, \quad (6.3)$$

$$\frac{\partial P[\beta]}{\partial \beta_{I,i}} = -2B_{I,i} + 2\beta_{I,i} C_i,$$

$$\frac{\partial^2 P[\beta]}{\partial \beta_{R,i}^2} = C_i,$$

$$\frac{\partial^2 P[\beta]}{\partial \beta_{I,i}^2} = C_i,$$

where the parameters $B_i$ and $C_i$ are given by:

$$B_i = \frac{1}{4} [\,0 \quad \underline{U}_{LENS,M,i}(\underline{\beta})^H\,] T_M^H R_{XX} T_M \begin{bmatrix} \underline{U}_{LENS,M,i}(\underline{\beta}) \\ 0 \end{bmatrix}, \quad (6.4)$$

$$C_i = \frac{1}{4} [\,0 \quad \underline{U}_{LENS,M,i}(\underline{\beta})^H\,] T_M^H R_{XX} T_M \begin{bmatrix} 0 \\ \underline{U}_{LENS,M,i}(\underline{\beta}) \end{bmatrix}.$$

In this definition: (1) $T_M$ is the transformation from Equation 3.7 that trransforms the LENS beamforming weight vector $\underline{W}_{LENS,M}(\underline{\beta})$ into the alternative beamforming weight vector $\underline{U}_{LENS,M}(\underline{\beta})$ [Appendeix B] and (2) $\underline{U}_{LENS,M,i}(\underline{\beta})$ is a vector that is entirely independent of $\beta_i$ and is defined to be:

$$\underline{U}_{LENS,M,i}(\underline{\beta})^H = \quad (6.5)$$

$$\left(\frac{1}{2}\right)^{M-2} [1 \quad \beta_1] * \cdots * [1 \quad \beta_{i-1}] * [1 \quad \beta_{i+1}] * \cdots * [1 \quad \beta_{M-1}].$$

Note that $\underline{U}_{LENS,M}(\underline{\beta})$ [Equation 3.6] and $\underline{U}_{LENS,M,i}$ are related through $\beta_i$:

$$\underline{U}_{LENS,M}(\underline{\beta})^H = \frac{1}{2}[\,\underline{U}_{LENS,M,i}(\underline{\beta})^H \quad 0\,] + \frac{\beta_i}{2}[\,0 \quad \underline{U}_{LENS,M,i}(\underline{\beta})^H\,]. \quad (6.6)$$

6.2 Relaxation LENS Implementation

Relaxtion LENS processing solves for $\hat{\beta}_{opt}$ is iteratively by cycling through the LENS parameters one-by-one and minimizing Equation 6.1 with respect to each $\beta_i$ individually, while holding the remaining parameters fixed. This process is based upon the idea of the Gauss-Seidel iteration to solve linear systems of equations.

In order to illustrate how this relaxation iteration operates, this section begins by exploring Equation 6.1 in the case of a known and fixed input covariance matrix $R_{XX}$. It then generalizes the result to yield the Relaxation LENS implementations that combine the relaxation iteration with a time-dependent input-covariance estimate $\overline{R}^{(l)}{}_{XX}$ to generate a time-dependent optimal LENS parameter set estimate $\hat{\beta}^{(l)}{}_{opt}$.

6.2.1 Covariance Relaxation

Recall the basic LENS probelm from Equation 6.1:

$$\hat{\beta}_{opt} = \arg\min_{\underline{\beta} \in C^{M-1}} P[\underline{\beta}].$$

The relaxation LENS solution to this minimization may be stated as follows.

1. Initialize the process with an arbitray parameter vector $\hat{\beta}_{opt}[0]$, such as the orthogonal LENS parameters $\underline{\beta}^{\perp}$ [Equation 3.2.1].

2. Update $\hat{\beta}_{opt}[k]$ into $\hat{\beta}_{opt}[k+1]$ by cycling through the LENS parameters $\beta_i$ exactly once and minimizing P[β] with respect to each $\beta_i$ while holding the remaining $\beta_m$, m≠i, fixed at their most recent values:

$$\hat{\beta}_{opt,i}[k+1] = \arg\min_{\beta_i \in C} P[\underline{\beta}] \Big|_{\beta_m, m \neq i \text{ fixed as desired}}. \quad (6.7)$$

Consider this update process in detail for an arbitray $\beta_i$. Since updates have already been performed for $\beta_m$, m<i, the most recent values of $\beta_m$, m≠i are:

$$\beta_m = \begin{cases} \hat{\beta}_{opt,m}[k+1] & m < i, \\ \hat{\beta}_{opt,m}[k] & m > i. \end{cases}$$

Given these fixed $\beta_m$, m≠i, it is possible to form $B_i$ and $C_i$ [Equation 6.4] and to use these to define $$\frac{\partial P[\beta]}{\partial \beta_{R,i}} \text{ and } \frac{\partial P[\beta]}{\partial \beta_{I,i}}. \quad \text{[Equation 6.3]}$$

Since $$\frac{\partial^2 P[\beta]}{\partial \beta_{R,i}^2} = \frac{\partial^2 P[\beta]}{\partial \beta_{I,i}^2} = C_i \geq 0,$$

then the solution to Equation 6.7 is obtained by setting $$\frac{\partial P[\beta]}{\partial \beta_{R,i}} \text{ and } \frac{\partial P[\beta]}{\partial \beta_{I,i}}$$

to 0 and $$\left.\begin{array}{l}\frac{\partial P[\beta]}{\partial \beta_{R,i}} = 2B_{R,i} + 2\beta_{R,i}C_i = 0 \Rightarrow \beta_{R,i} = -\frac{B_{R,i}}{C_i},\\ \frac{\partial P[\beta]}{\partial \beta_{I,i}} = -2B_{I,i} + 2\beta_{I,i}C_i = 0 \Rightarrow \beta_{I,i} = \frac{B_{I,i}}{C_i},\end{array}\right\} \Rightarrow \beta_i = -\frac{B_i^*}{C_i}.$$

This yields $$\beta_{opt,i}[k+1] = -\frac{B_i^*}{C_i}$$

to solve Equation 6.7.

Figure 15:
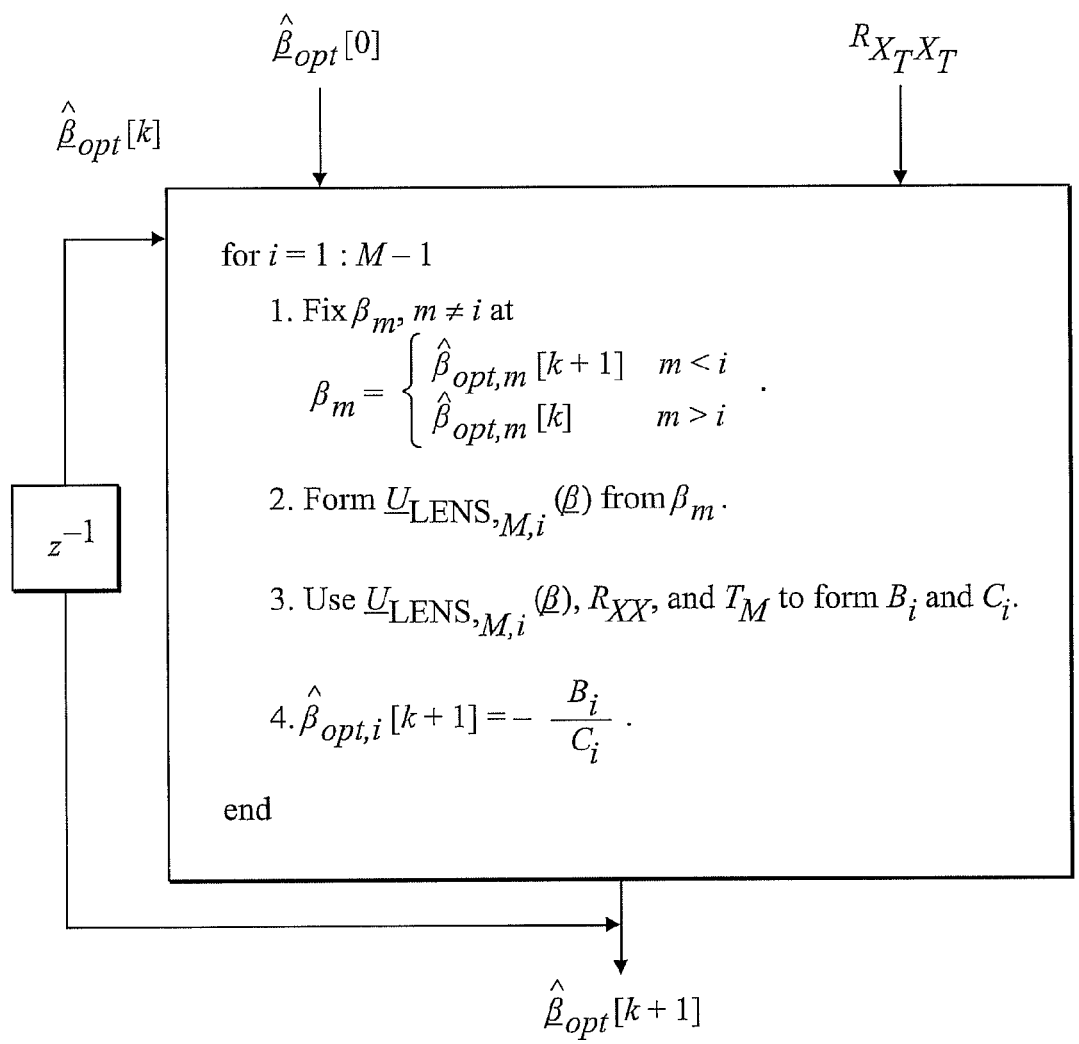
FIG. 15 is a block diagram illustration of processing steps for solving for $\underline{\beta}_{opt}$ given a known covariance matrix.

As $k \to \infty$, $\hat{\beta}_{opt}[k]$ converges to the true underlying $\hat{\beta}_{opt}$ [as demonstrated by the simulations in Section 6.5.1]. FIG. 15 depicts the overall LENS relaxation iteration process.

6.2.2 Relaxation LENS Processing

Now that the basic concept of the LENS relaxation iteration in the case of a known and fixed input covariance has been derived, it is necessary to modify the iteration to suit the more realistic situation in which the input covariance is unknown and time-varying. This is achieved by using the temporal stream of array inputs, $\{X^{(l)}\}$, to form a time-dependent estimate $\hat{R}^{(l)}_{XX}$ of $R_{XX}$.

The most direct Relaxation LENS implementation would use each $\hat{R}^{(l)}_{XX}$ to form a corresponding $P[\beta]^{(l)}$ and would apply a full relaxation solution until $\hat{\beta}^{(l)}_{opt}$ has been generated to the desired precision. Assuming that the relaxation iteration converges to the true $\hat{\beta}_{opt}$ solution to Equation 6.1 (this is demonstrated below), this system is equivalent to one that uses Equation 6.2 directly to generate $\hat{\beta}^{(l)}_{opt}$ from $R^{(l)}_{XX}$. Unfortunately, this implementation has the disadvantage that it requires several iterations to obtain each $\hat{\beta}^{(l)}_{opt}$, which may be computationally demanding.

Simplified adaptive relaxation implementations result by realizing that $\hat{R}^{(l)}_{XX}$ is correlated with $\hat{R}^{(l-1)}_{XX}$: many of the same input observations go into the averages that form $\hat{R}^{(l)}_{XX}$ and $\hat{R}^{(l-1)}_{XX}$. For this reason, $\hat{\beta}^{(l)}_{opt}$ and $\hat{\beta}^{(l-1)}_{opt}$ are generally 'close' to one another. The number of relaxation iterations required to obtain $\hat{\beta}^{(l)}_{opt}$ can be substantially reduced by using $\hat{\beta}^{(l-1)}_{opt}$ as initialization for the iteration to solve for $\hat{\beta}^{(l)}_{opt}$. In fact, if $\hat{\beta}^{(l)}_{opt}$ is sufficiently slowly-changing, then it is possible to update only a fraction of the LENS parameters at each input step while maintaining reasonable solution accuracy.

Figure 16A:
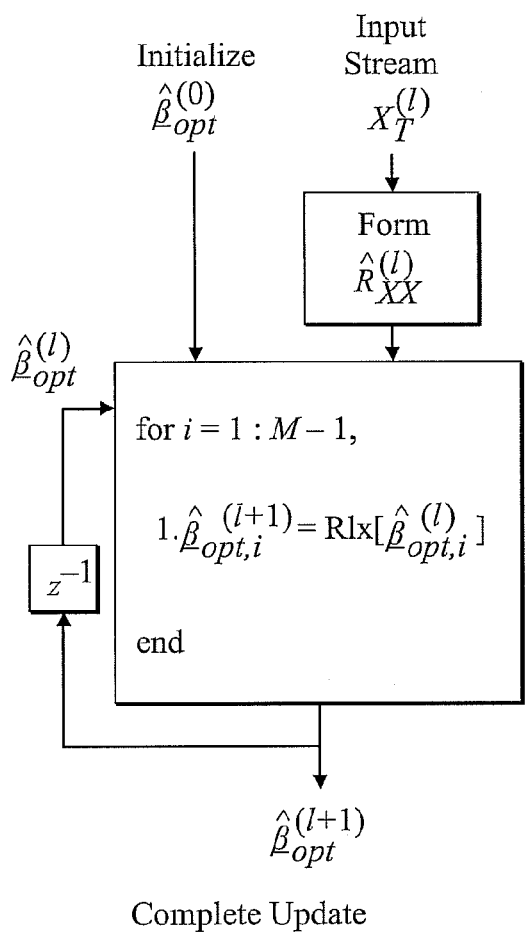
FIGS. 16A and 16b (collectively FIG. 16) are block diagram illustrations of processing steps regarding the adaptive relaxation based solutions.
Figure 16B:
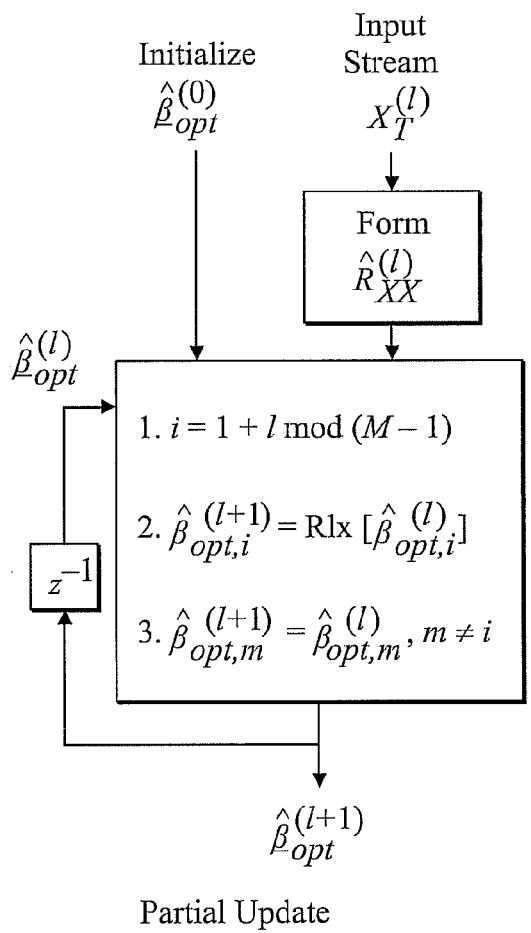

FIG. 16 shows two possible simplified implementations, using the notation $Rlx[\hat{\beta}^{(l)}_{opt,i}]$ to denote a relaxation iteration update of the parameter $\hat{\beta}^{(l)}_{opt,i}$.

1. The Compete Update system updates each of the M−1 LENS parameters in $\hat{\beta}^{(l-1)}_{opt}$ to yield $\hat{\beta}^{(l)}_{opt}$.

2. The Partial Update system updates exactly one of the LENS parameters in $\hat{\beta}^{(l-1)}_{opt}$ to yield $\hat{\beta}^{(l)}_{opt}$. Note that for this system, care must be taken so that the relaxation update still cycles through all M−1 LENS parameters. This cycling is achieved by updating parameter $i = [1 + (l \mod M-1)]$ at input step l.

The primary trade-off between these two implementations is one of implementation complexity versus solution accuracy and adaptations speed. By updating only one parameter per unit observation, the partial update implementation reduces the computations required by a factor of M−1 relative to the complete update implementation. This reduced complexity comes at the cost of updating each LENS parameter only once every M−1 input observations, which increases the system adaptation time to a changing environment and reduces the overall solution accuracy. As shown by the simulations of Section 6.5.2, however, the covariance estimate $\hat{R}^{(l)}_{XX}$ generally changes slowly enough that this latter effect is minor and that Complete and Partial Update Relaxation LENS implementations yield nearly identical results.

6.3 Gradient LENS Implementation

Graident LENS processing takes a different approach to solving Equation 6.1. Specifically, it calculates the gradient of $P[\beta]$ with respect to the LENS parameters and steps along this gradient until $P[\beta]$ has been minimized. In a manner similar to that of the previous section, this section develops gradient LENS processing by considering the problem in the case of a known covariance matrix, and then generalizing the result to yield the Gradient LENS implementation that generates the time-dependent $\hat{\beta}^{(l)}_{opt}$ for an unknown covariance matrix.

6.3.1 Known Covariance Gradient Search

Recall the basic LENS parameter problem from Equation 6.1, $$\hat{\beta}_{opt} = \arg \min_{\beta \in C^{M-1}} P[\beta].$$

The basic gradient-based LENS solution to this minimization may be state as follos.

1. Initialize $\hat{\beta}_{opt}[0]$ with an arbitrary parameter vector, such as the orthogonal LENS parameter set, $\beta^\perp$, from Equation 3.2.1.

2. Update $\hat{\beta}_{opt}[k]$ into $\hat{\beta}_{opt}[k+1]$ by calculating the gradient of $P[\beta]$ at $\hat{\beta}_{opt}[k]$ and taking a small step along this gradient toward the function minimum:

$$\hat{\beta}_{opt}[k+1] = \hat{\beta}[k] - \mu \nabla P[\beta]|_{\beta = \hat{\beta}^{opt}[k]},$$

where Equation 6.3 allows $\nabla P[\underline{\beta}]$ to be writeen as:

$$\nabla P[\underline{\beta}] = \begin{bmatrix} \frac{\partial P[\beta]}{\partial \beta_{R,1}} \\ \frac{\partial P[\beta]}{\partial \beta_{R,2}} \\ \vdots \\ \frac{\partial P[\beta]}{\partial \beta_{R,M-1}} \end{bmatrix} + j \begin{bmatrix} \frac{\partial P[\beta]}{\partial \beta_{I,1}} \\ \frac{\partial P[\beta]}{\partial \beta_{I,2}} \\ \vdots \\ \frac{\partial P[\beta]}{\partial \beta_{I,M-1}} \end{bmatrix} = 2 \begin{bmatrix} B_1^* + \beta_1 C_1 \\ B_2^* + \beta_2 C_2 \\ \vdots \\ B_{M-1}^* + \beta_{M-1} C_{M-1} \end{bmatrix}.$$

Using the definitions of $B_i$ and $C_i$ [Equations 6.4], the vectors $\underline{U}_{LENS,M}(\underline{\beta})$ and $\underline{U}_{LENS,M}(\underline{\beta})$ [Equations 3.6 and 6.5], and the relationship between $\underline{U}_{LENS,M}(\underline{\beta})$ and $\underline{U}_{LENS,M,i}(\underline{\beta})$ [Equation 6.6], $B_i^* + B_i C_i$ may be re-written as:

$$B_i^* + \beta_i C_i = \frac{1}{2} \underline{U}_{LENS,M}(\underline{\beta})^H R_{X_T X_T} \begin{bmatrix} 0 \\ \underline{U}_{LENS,M,i}(\underline{\beta})^H \end{bmatrix},$$

$$= \frac{1}{2} \begin{bmatrix} 0 & \underline{U}_{LENS,M,i}(\underline{\beta})^T \end{bmatrix} R_{X_T X_T}^* \underline{U}_{LENS,M}(\underline{\beta})^*,$$

where the second equality arises from he fact that $(B_i^* + \beta_i C_i)^T = B_i^* + \beta_i C_i$. This expression for $B_i^* + \beta_i C_i$ yields:

$$\nabla P[\underline{\beta}] = \underbrace{\begin{bmatrix} 0 & \underline{U}_{LENS,M,1}(\underline{\beta})^T \\ 0 & \underline{U}_{LENS,M,2}(\underline{\beta})^T \\ \vdots & \vdots \\ 0 & \underline{U}_{LENS,M,M-1}(\underline{\beta})^T \end{bmatrix}}_{T_{LENS,M}(\underline{\beta})} R_{X_T X_T}^* \underline{U}_{LENS,M}(\underline{\beta})^*. \quad (6.9)$$

The step-size parameter μ in the gradient update [Equation 6.8] governs the overall rate and quality of the iteration covergence. A larger step-size resluts in faster initial convergence towards the optimum, but exhibits oscillation about the optimal value (also known as misadjustment). A smaller step-size results in slower covergence but less misadjustment. It should also be noted that, if the step-size is too large, then this iteration may diverge. This research presents no proofs nor performs any investigations into the range of step-size that guarantees convergence of this LENS gradient-search. Simulations suggest, however, that the general gradient-based convergence rule $$\text{Iteration Convergence} \Leftrightarrow \mu = \frac{\alpha}{E[X^H X]}, 0 < \alpha < 1,$$

yields acceptable results provided that the parameter magnitudes, $|\hat{\beta}_{opt,i}[k]|^2$, $i = \{1, 2, \ldots, M-1\}$, are not too large. This research imposes the following modification upon the step-size in order to reduce the step size when the $|\hat{\beta}_{opt,i}[k]|^2$ are large:

$$\mu[k] = \frac{\alpha}{KE[X^H X]}, 0 < \alpha < 1, \text{ with} \quad (6.10)$$

-continued $$K = \max\left[1, \frac{\sum_{i=1}^{M-1} |\hat{\beta}_{opt,i}[k]|^2}{M-1}\right].$$

In this case, the parameter K is restricted to be greater than 1 to ensure that it only shrinks and never enlarges μ[k].

6.3.2 Gradient LENS Processing

The most direct gradient-search modification to accommodate an unknown and changing input covariance would use the input stream, $\{\underline{X}^{(l)}\}$ to form $\hat{R}^{(l)}_{XX}$ and to apply a full gradient search to each $\hat{R}^{(l)}_{XX}$ to yield $\hat{\underline{\beta}}^{(l)}_{opt}$. Such a system would be inefficient, however, since gradient search iterations generally have long convergence times.

A simpler implementation may be realized by synchronizing the gradient-search iteration to the input observation iteration. Specifically, use $\hat{R}^{(l)}_{XX}$ to generate the current gradient $\nabla P[\underline{\beta}]^{(l)}$ [Equation 6.9] and substitute this into Equation 6.8 to update $\hat{\underline{\beta}}^{(l)}_{opt}$ into $\hat{\underline{\beta}}^{(l+1)}_{opt}$:

$$\hat{\underline{\beta}}_{opt}^{(l+1)} = \hat{\underline{\beta}}_{opt}^{(l)} - \mu^{(l)} \nabla P[\underline{\beta}]^{(l)}|_{\underline{\beta} = \underline{\beta}_{opt}^{(l)}}. \quad (6.11)$$

For this implementation, the time-dependent step-size parameter defined in Equation 6.10 may be approximated by:

$$\mu^{(l)} = \frac{\alpha}{K \hat{\sigma}_{\underline{X}}^{2(l)}} \quad 0 < \alpha < 1, \text{ with}$$

$$K = \max\left[1, \frac{\sum_{i=1}^{M-1} |\hat{\beta}_{opt,i}^{(l)}|^2}{M-1}\right],$$

where $\sigma^{2(l)}_{\underline{X}}$ is a running estimate of the total expected array input power, $E[\underline{X}^H \underline{X}]$, $l$.

In general, each update step in Gradient LENS processing (or in any gradient-based adaptive algorithm) is small. Therefore, the adaptive Gradient LENS processing does not require a highly accurate estimate of the input covariance to yield acceptable results. The Gradient LENS processing estimates $\hat{R}^{(l)}_{XX}$ as the instantaneous input covaraince:

$$\hat{R}^{(l)}_{XX} = \underline{X}^{(l)} \underline{X}^{(l)H}. \quad (6.12)$$

This reflects the covariance matrix estimate used by the traditional Frost Processing and Scaled Projection Algorithm gradient-based beamforming implementations [Section 2.3.3].

6.4 Computational Complexity

Figure 17:
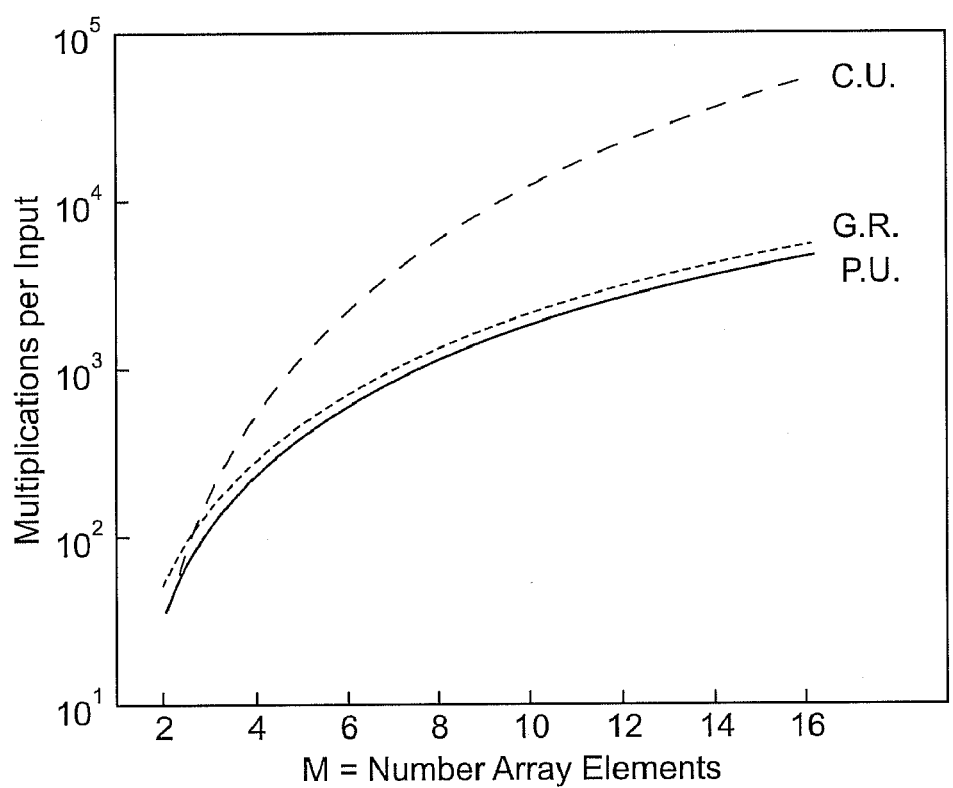
FIG. 17 is a plot that illustrates the relative computational complexity for the complete update relaxation, partial update relaxation and gradient LENS implementations.

FIG. 17 plots the number of real multiplications required per input snap shot, , $\underline{X}^{(l)}$, by Complete Update Relaxations, Partial Update Relaxation, and Gradient LENS$^S$ Processing.

Notably, the present invention separates the robustness constraining process from the beamforming power minimization, in contrast to prior art techniques which combine the robustness constraint into the beamforming power minimization. One of ordinary skill will recognize that the signal processing technique of the present invention has a wide variety of system applications.

Although the present invention has been shown and described with respect to several preferred embodiments thereof, various changes, omissions and additions to the form and detail thereof, may be made therein, without departing from the spirit and scope of the invention.

What is claimed is:

1. A method of selecting the tap weights $W_N$ for an adaptive multi-tap frequency domain digital filter that processes an input signal vector X from a plurality of spatially separated transducers that detect energy from a plurality of sources including a target energy source and at least one non-target energy source, wherein the filter receives and processes the input signal vector X to attenuate noise from non-target sources and provides an output signal vector Y, the method comprising the steps of:

parameterizing each of the tap weights $W_N$ such that each of the tap weights $W_N$ is characterized by a vector of parameters $\beta_{opt}$;

solving for each parameter of the vector $\beta_{opt}$ by minimizing the expected power of the array output signal Y;

applying a robustness-control transformation to the vector $\beta_{opt}$ to provide a robust vector $\beta_{rob}$, wherein the robustness-control transformation identifies and reduces target canceling components of the vector $\beta_{opt}$ that arise from incomplete target location knowledge while preserving non-target canceling components; and forming the weight vector indicative of the filter tap weights as a function of the vector $\beta_{rob}$.

2. A signal processing apparatus that receives an input signal vector X from a plurality of spatially separated transducers that detect energy from a plurality of sources including a target energy source and at least one non-target energy source, wherien the apparatus processes the input signal vector X with a digital filter comprising a plurality of tap weights $W_N$ to attenuate signal noise from non-target sources and provide a resultant output signal vector Y, said apparatus comprising:

means for parameterizing each of said tap weights $W_N$ such that each of said tap weights $W_N$ is characterized by a vector of parameters $\beta_{opt}$;

means for solving for each parameter of the vector $\beta_{opt}$ by seeking a minimum for the expected power of the output signal Y;

means for applying a robustness-control transformation to the vector $\beta_{opt}$ to provide a robust vector $\beta_{rob}$, wherein the robustness-control transformation identifies and reduces target canceling components of the vector $\beta_{opt}$ that arise from incomplete target location knowledge while preserving non-target canceling components; and means for forming a weight vector indicative of the tap weights as a function of the vector $\beta_{rob}$.

* * * * *